United States Patent
Saggar et al.

(10) Patent No.: US 12,425,152 B2
(45) Date of Patent: Sep. 23, 2025

(54) UPLINK NON-CODEBOOK BASED PRECODER SELECTION USING DMRS MEASUREMENT

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/452,972

(22) Filed: Oct. 29, 2021

(65) Prior Publication Data

US 2022/0140970 A1    May 5, 2022

Related U.S. Application Data

(60) Provisional application No. 63/108,233, filed on Oct. 30, 2020.

(51) Int. Cl.
*H04L 5/00* (2006.01)
*H04B 7/06* (2006.01)
*H04L 25/02* (2006.01)
*H04W 72/20* (2023.01)

(52) U.S. Cl.
CPC ........ *H04L 5/0048* (2013.01); *H04L 25/0224* (2013.01); *H04W 72/20* (2023.01); *H04B 7/0626* (2013.01)

(58) Field of Classification Search
CPC .. H04L 5/0048; H04L 25/0224; H04W 72/20; H04B 7/0626
See application file for complete search history.

(56) References Cited

U.S. PATENT DOCUMENTS

| 2014/0269492 A1* | 9/2014 | Forenza | H04B 7/0452 370/328 |
| 2019/0140714 A1* | 5/2019 | Tan | H04B 7/0695 |
| 2020/0396046 A1* | 12/2020 | Kwon | H04B 7/0632 |

(Continued)

OTHER PUBLICATIONS

Apple Inc., "Further considerations on beam management enhancement", 3GPP TSG RAN WG1 #99, Reno, USA, Nov. 18-22, 2019, R1-1912826 (Year: 2019).*

(Continued)

*Primary Examiner* — Joseph A Bednash
(74) *Attorney, Agent, or Firm* — Procopio, Cory, Hargreaves & Savitch LLP

(57) ABSTRACT

An apparatus, e.g., a UE, for selecting an uplink precoder using a non-codebook-based procedure is disclosed. The UE may receive, from a base station (BS), at least one downlink reference signal comprising at least one DMRS via at least one downlink channel. The UE may measure, based on the at least one downlink reference signal, the at least one downlink channel. The measuring may be based at least in part on the at least one DMRS. The UE may select at least one first uplink precoder for at least one uplink channel corresponding to the at least one downlink channel based on the measuring of the at least one downlink channel. The UE may transmit, to the BS, at least one uplink reference signal based on the at least one first uplink precoder for the at least one uplink channel.

20 Claims, 14 Drawing Sheets

(56) References Cited

U.S. PATENT DOCUMENTS

2022/0377784 A1* 11/2022 Matsumura ........... H04L 5/0044
2023/0179372 A1*  6/2023 Liu ....................... H04L 5/0051
                                                        370/330

OTHER PUBLICATIONS

3GPP TS 38.211 V16.3.0 (Sep. 2020); 3rd Generation Partnership Project; Technical Specification Group Radio Access Network; NR; Physical channels and modulation (Release 16); pp. 1-7, 98-103 and 105 (Year: 2020).*

* cited by examiner

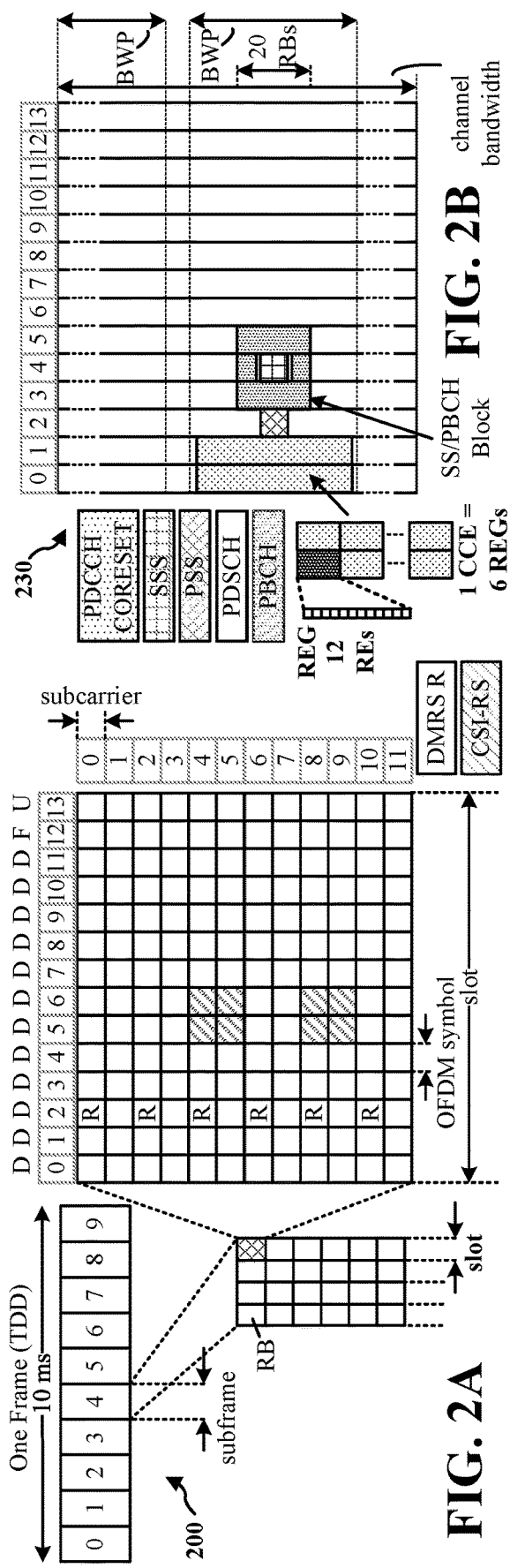
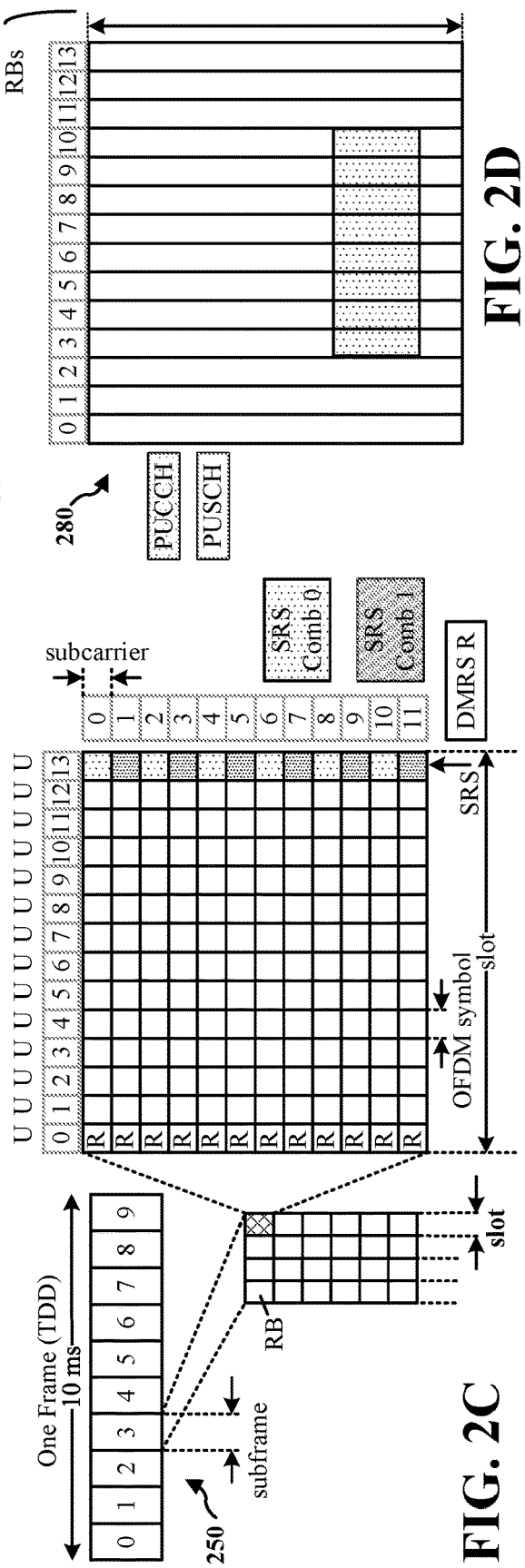
FIG. 2A
FIG. 2B
FIG. 2C
FIG. 2D

UPLINK NON-CODEBOOK BASED PRECODER SELECTION USING DMRS MEASUREMENT

CROSS REFERENCE TO RELATED APPLICATION(S)

This application claims the benefit of and priority to U.S. Provisional Application Ser. No. 63/108,233, entitled "Uplink Non-Codebook Based Precoder Selection Using DMRS Measurement" and filed on Oct. 30, 2020, which is expressly incorporated by reference herein in its entirety.

TECHNICAL FIELD

The present disclosure relates generally to communication systems, and more particularly, to the selection of an uplink precoder based on a downlink reference signal.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus, e.g., a user equipment (UE) are provided. The UE may receive, from a base station (BS), at least one downlink reference signal comprising at least one demodulation reference signal (DMRS) via at least one downlink channel. The UE may measure, based on the at least one downlink reference signal, the at least one downlink channel. The measuring may be based at least in part on the at least one DMRS. The UE may identify at least one first uplink precoder for at least one uplink channel corresponding to the at least one downlink channel based on the measuring of the at least one downlink channel. The UE may transmit, to the BS, at least one uplink reference signal based on the at least one first uplink precoder for the at least one uplink channel.

In another aspect of the disclosure, a method, a computer-readable medium, and an apparatus, e.g., a BS are provided. The BS may transmit, to a UE, at least one downlink reference signal comprising at least one DMRS via at least one downlink channel. The at least one downlink reference signal may be usable by the UE for measuring the at least one downlink channel. The measuring may be based at least in part on the at least one DMRS. The BS may receive, from the UE, at least one uplink reference signal indicative of at least one second uplink precoder for at least one uplink channel corresponding to the at least one downlink channel. The at least one second uplink precoder may be a subset of at least one first uplink precoder selected by the UE for the at least one uplink channel based on the measuring of the at least one downlink channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
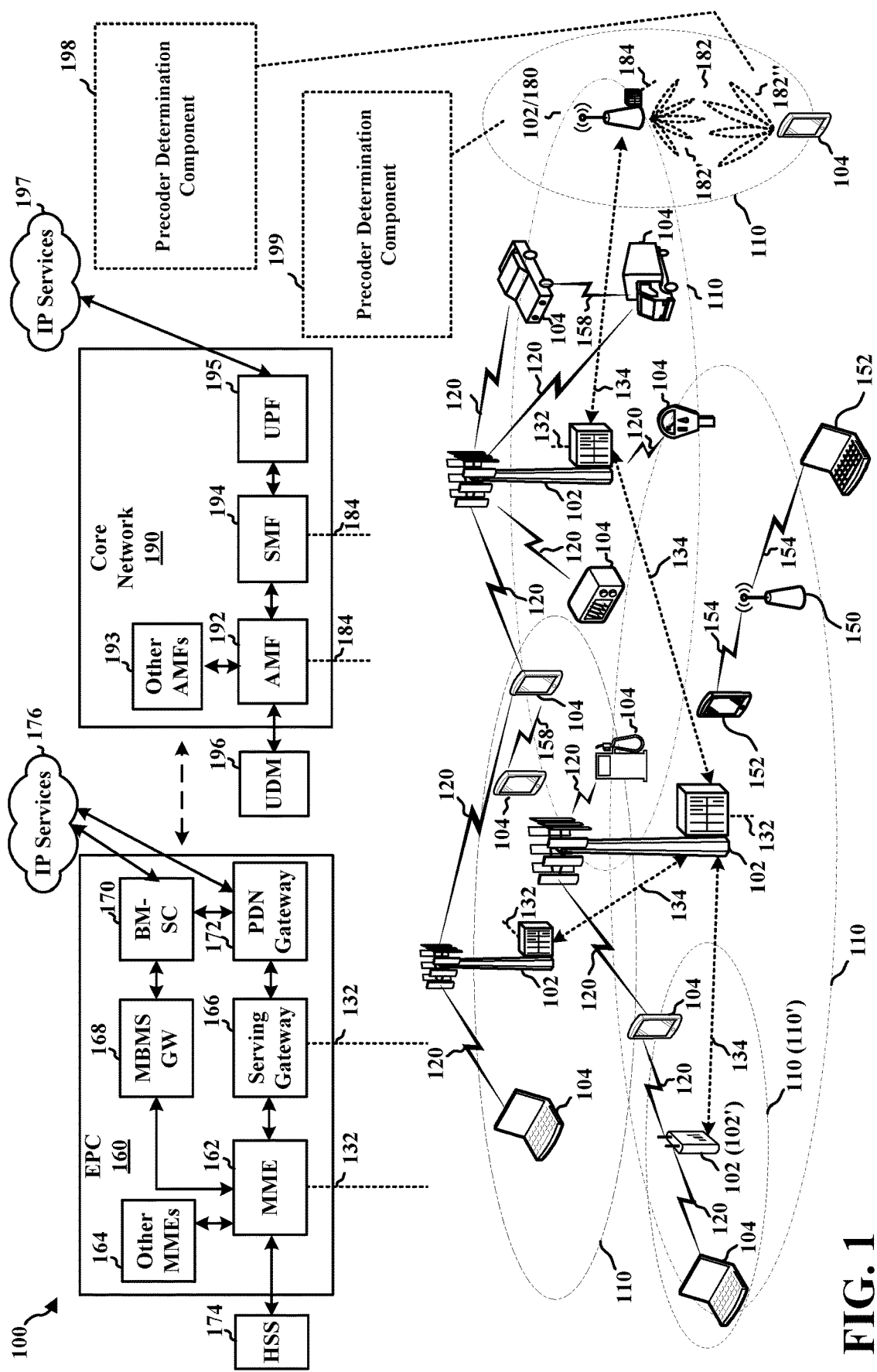
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a precoder determination component 198 that assists with the selection of an uplink precoder based on a downlink reference signal. The precoder determination component 198 may be configured to receive, from a BS, at least one downlink reference signal comprising at least one DMRS via at least one downlink channel. The precoder determination component 198 may also be configured to measure, based on the at least one downlink reference signal, the at least one downlink channel. The measuring may be based at least in part on the at least one DMRS. The precoder determination component 198 may also be configured to select at least one first uplink precoder for at least one uplink channel corresponding to the at least one downlink channel based on the measuring of the at least one downlink channel. The precoder determination component 198 may also be configured to transmit, to the BS, at least one uplink reference signal based on the at least one first uplink precoder for the at least one uplink channel.

In certain aspects, the base station 180 may include a precoder determination component 199 that assists with the selection of an uplink precoder based on a downlink reference signal. The precoder determination component 199 may be configured to transmit, to a UE, at least one downlink reference signal comprising at least one DMRS via at least one downlink channel. The at least one downlink reference signal may be usable by the UE for measuring the at least one downlink channel. The measuring may be based at least in part on the at least one DMRS. The precoder determination component 199 may also be configured to receive, from the UE, at least one uplink reference signal indicative of at least one second uplink precoder for at least one uplink channel corresponding to the at least one downlink channel. The at least one second uplink precoder may be a subset of at least one first uplink precoder selected by the UE for the at least one uplink channel based on the measuring of the at least one downlink channel. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
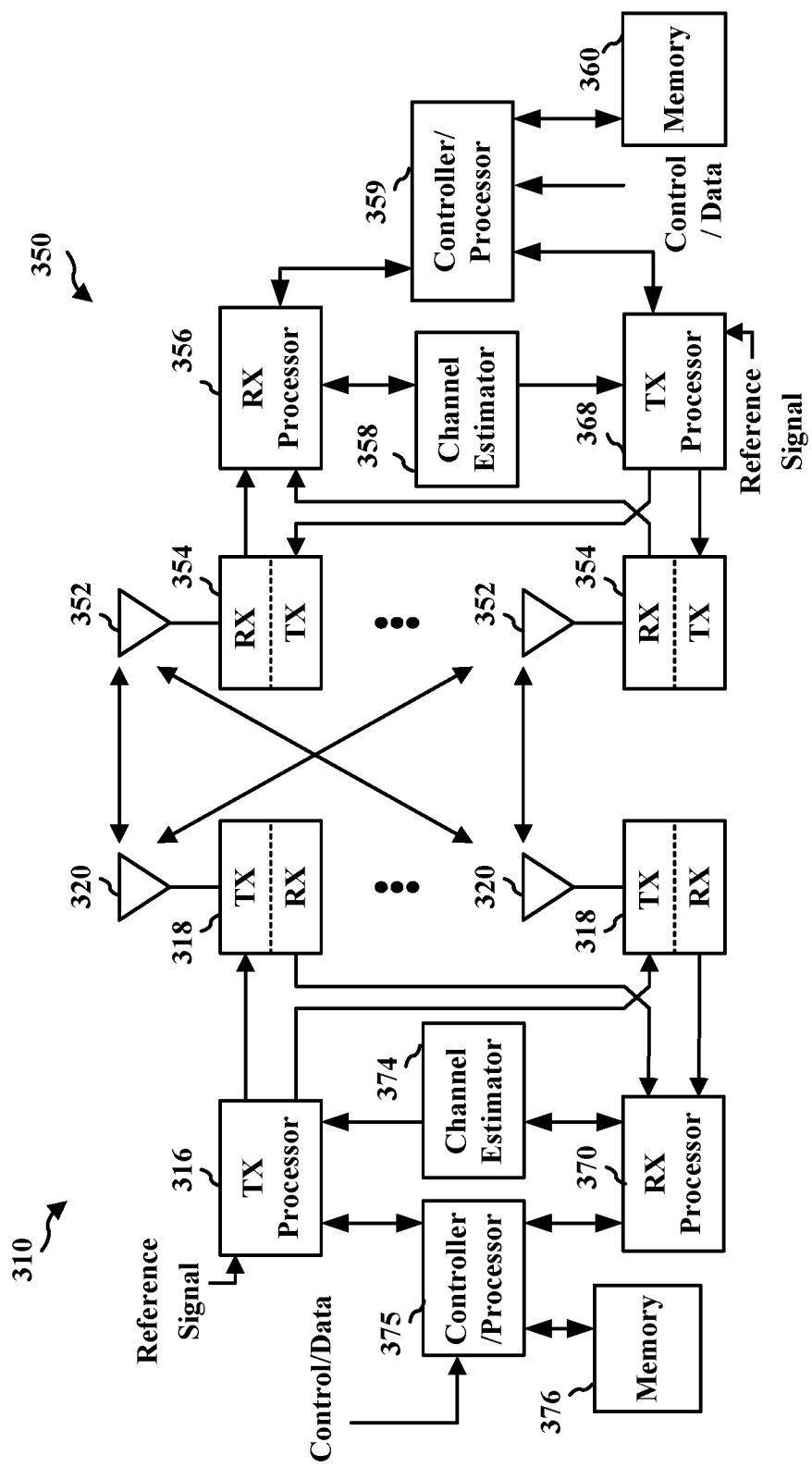
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the precoder determination component 198 of FIG. 1. At least one of the TX processor 316, the RX processor 370, and the controller/processor 375 may be configured to perform aspects in connection with the precoder determination component 199 of FIG. 1.

A number of envisaged use cases may exist for reduced capability (Redcap) devices. Examples may include industrial wireless sensors (e.g., pressure sensors, temperature sensors, humidity sensors, motion sensors, accelerometers, actuators, etc.). These devices may be uplink heavy with the data rate in the range of a few Mbps, and may have a few years of battery life. Further examples may include video surveillance cameras. These devices may be UL dominated with the data rate in the range of tens of Mbps. Additional examples may include wearables (e.g., smart watches, rings, eHealth related and medical monitoring devices, etc.). These devices may experience both UL and DL traffic, and may have up to 1-2 weeks of battery life.

Redcap devices may be associated with a number of innovation specifications. Reduced UE bandwidth and complexity may be desired, which correspond to a relaxed UE processing time and capability. Accordingly, coverage recovery may be desired. Uplink heavy transmissions may need to be accommodated. There may also be a need to create more space for uplink transmissions. Power and battery saving may be desired, which may utilize lean and efficient signaling while maintaining or improving performance.

Redcap devices may have reduced power capability and reduced bandwidth. Therefore, there may be a need to maximally utilize available resources and minimize any extra signaling overhead. Redcap devices may be expected to be uplink heavy. Accordingly, downlink signaling resources may need to be reduced.

In the uplink of certain types of wireless communications, e.g., 5GNR, multiple layers of information may be transmitted (e.g., from one to four layers). Digital precoding may be needed to transmit these layers simultaneously. There are two types of procedures for precoder selection in the uplink. In a codebook-based procedure, the base station may choose a precoder from a pre-specified codebook, and instruct the UE to transmit using the chosen precoder. In a non-codebook-based procedure, the UE may be free to choose its own precoder. However, the network may downselect from the choices offered by the UE.

Figure 4:
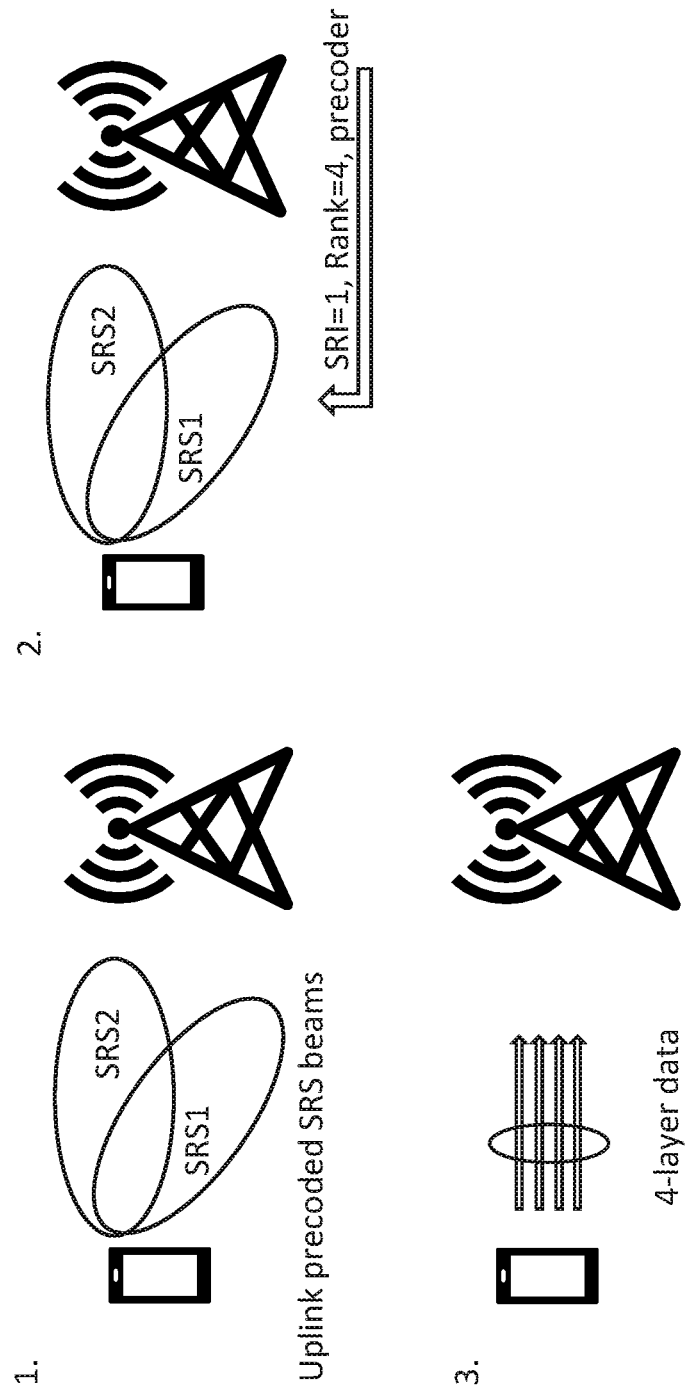
FIG. 4 a diagram illustrating codebook-based uplink precoder selection procedure.

FIG. 4 is a diagram 400 illustrating codebook-based uplink precoder selection procedure. Reciprocity (between UL and DL) may not be assumed in the procedure. In the first operation, the UE may send one or more beamformed multi-port SRS in the uplink. The base station may detect each SRS, select the best SRS among the detected SRS, choose the best precoder on this SRS, and inform the UE about its choice. Each SRS may be expected to be spatially beamformed with a different spatial filter. Therefore, in the second operation, the base station may indicate its choice of SRS (using "SRS-Resource-Indicator"), the rank of the uplink transmission, and the precoder matrix to be used on that SRS in the scheduled grant. In the third operation, the UE may transmit uplink data based on the rank and the precoder matrix indicated in the scheduled grant. Codebooks may be different for the assumption of full-, partial-, or no-coherence among antenna ports at the UE.

Figure 5:
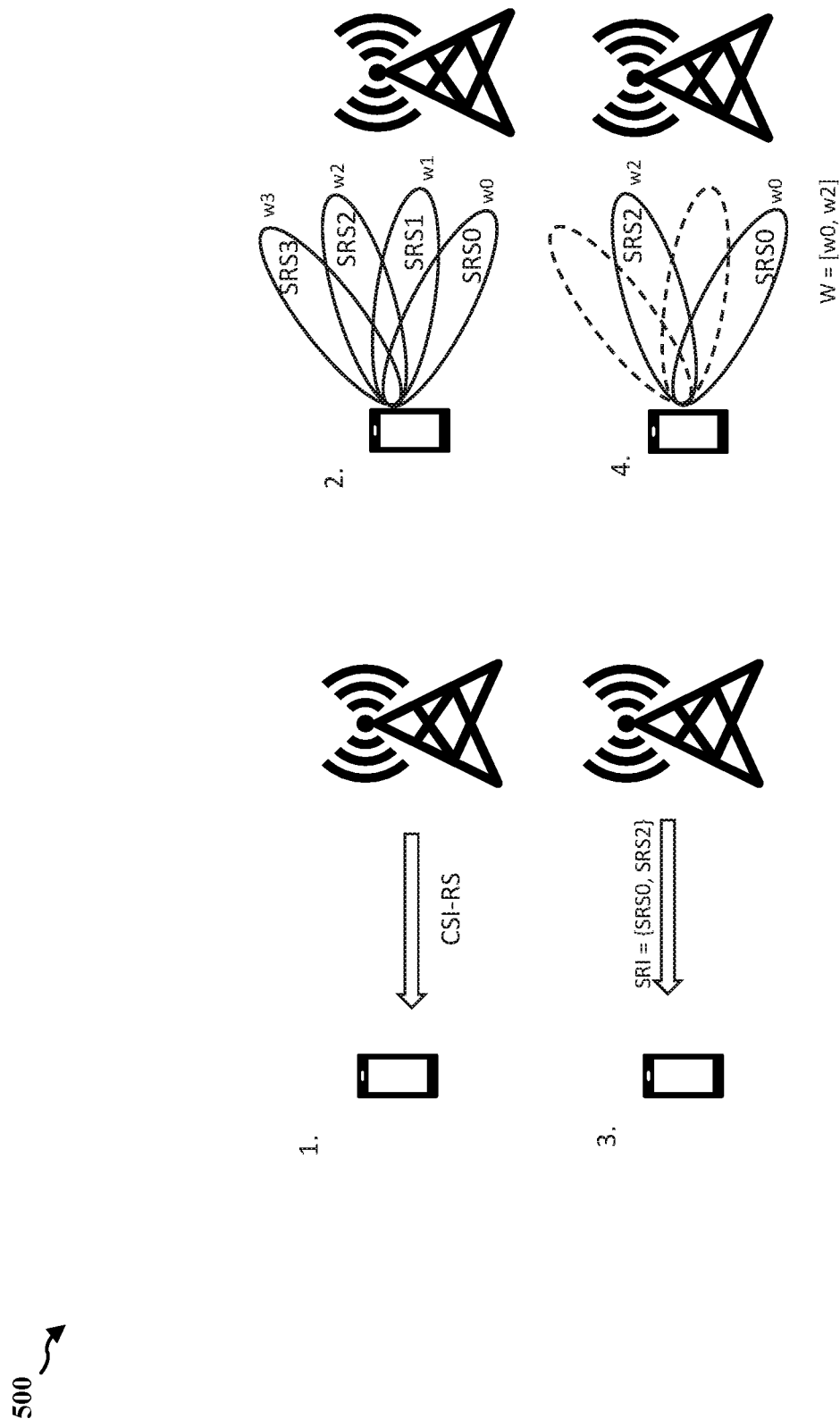
FIG. 5 is a diagram illustrating non-codebook-based uplink precoder selection procedure.

FIG. 5 is a diagram 500 illustrating non-codebook-based uplink precoder selection procedure. Channel reciprocity may be assumed. In other words, the uplink channel may correspond to, and may be inferred from the downlink channel. In the first operation, the base station may transmit a CSI-RS (which may potentially be beamformed), and the UE may measure the channel. The UE may choose the number of layers to transmit (e.g., up to four layers) and the precoders of these layers. In the second operation, the UE may send precoded SRS on all the layers in the uplink. The base station may measure each SRS, and may decide whether to allow or disallow transmission on this layer. In the third operation, the base station may indicate to the UE the layer(s) on which the UE may transmit, in a downlink message in the scheduling grant. In the fourth operation, the UE may use the final set of layers and the corresponding precoders to send PUSCH transmissions. It should be appreciated that the device indication of precoder selection (e.g., the second operation) is not performed for each scheduled transmission. The uplink SRS transmission may take place periodically (e.g., periodic or semipersistent SRS) or on demand (e.g., aperiodic SRS). In contrast, the network indication of a precoder, which in practice may be the network indication of the subset of beams of the device precoder, may be performed for each scheduled PUSCH transmission.

The DMRS may be sent along with data transmissions in both a PDSCH and a PDCCH. The DMRS in the PDSCH may be up to eight orthogonal ports for single-user MIMO (SU-MIMO) (i.e., type 1), or up to 12 orthogonal ports for multi-user MIMO (MU-MIMO) (i.e., type 2), out of which eight users may be multiplexed with a maximum of four layers per user. The DMRS in the PDCCH may be a single port. The DMRS may be precoded as well as beamformed. PDSCH may arrive on dynamic scheduling through DCI or through semi-persistent scheduling (SPS). The PDCCH may be a periodic downlink channel.

Non-codebook-based precoding may utilize reciprocity by using downlink reference signals (e.g., CSI-RS) to perform channel estimation and uplink precoder selection. Reliance on extra CSI-RS resources may be reduced by using either the DMRS on a PDSCH or DMRS on a PDCCH to perform channel estimation. A mix of CSI-RSs and DMRSs may be used to jointly measure the multi-port channel. Accordingly, signaling overhead may be reduced, and more slots may be made available for uplink data transmissions.

Assuming the channel is sufficiently reciprocal, the UE may measure the channel and estimate the uplink beamformers based on a mix of downlink DMRSs and CSI-RSs. The DMRS may include DMRS in a PDSCH and/or DMRS in a PDCCH. The UE may use all the DMRSs within a given time window of its scheduled uplink grant corresponding to the at least one uplink reference signal transmission (e.g., at least one SRS transmission) to estimate the channel.

The network may indicate to the UE the length of the time window through a DCI, a media access control (MAC) control element (CE) (MAC-CE), or RRC signaling. The indication may be provided before the PDSCH and/or PDCCH blocks containing the DMRSs that fall within the time window are transmitted.

If the number of layers in the measured DMRS (in a PDSCH/PDCCH) is less than the specified number of layers to be sensed for uplink transmission, the base station may schedule additional CSI-RS resources to enable additional measurements to estimate the precoder for more layers. On the other hand, if DMRS symbols in the time window contain more layers than specified for uplink measurement, the UE may downselect based on either the best quality layers or a pre-configured option from the network.

The network may indicate a quasi co-location (QCL) relationship between the DMRS and any transmitted CSI-RS for the purpose of uplink precoder selection through a transmission configuration indicator (TCI) state indication. For example, there may be a QCL type D relationship between the DMRS and the CSI-RS (e.g., the same spatial RX filter may be specified).

Figure 6:
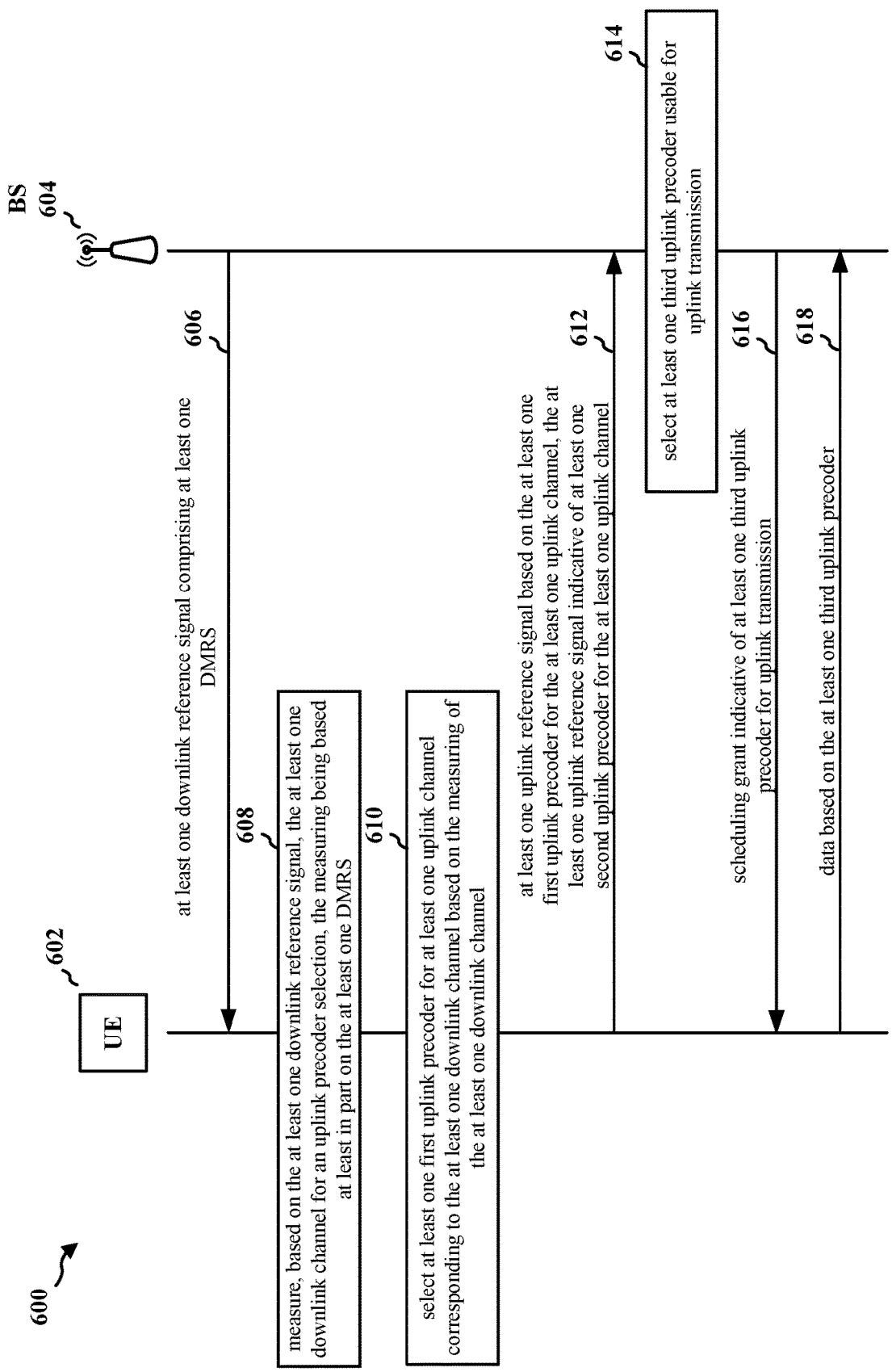
FIG. 6 is a call-flow diagram illustrating non-codebook-based uplink precoder selection.

FIG. 6 is a call-flow diagram 600 illustrating non-codebook-based uplink precoder selection. At 606, the BS 604 may transmit to the UE 602, and the UE 602 may receive from the BS 604, at least one downlink reference signal including at least one DMRS via at least one downlink channel. The at least one DMRS may be received via at least one of a PDSCH or a PDCCH. In one aspect, optionally, the at least one downlink reference signal may further include at least one CSI-RS. The measuring may be further based on the at least one CSI-RS. In one further aspect, the BS 604 may transmit to the UE 602, and the UE 602 may receive from the BS 604, an indication of a QCL relationship between the at least one DMRS and the at least one CSI-RS for uplink precoder selection through a TCI state indication.

At 608, the UE 602 may measure, based on the at least one downlink reference signal, the at least one downlink channel. The measuring may be based at least in part on the at least one DMRS. The at least one DMRS may be transmitted by the BS 604 and received by the UE 602 within a predetermined time window in connection with a scheduled uplink grant and the at least one uplink reference signal (e.g., an SRS). The at least one DMRS may be transmitted by the BS 604 and received by the UE 602 in at least one of one or more PDSCH blocks or one or more PDCCH blocks. An indication of a length of the predetermined time window may be transmitted by the BS 604 and received by the UE 602 through at least one of a DCI, a MAC-CE, or RRC signaling prior to the transmission and reception of the at least one of the one or more PDSCH blocks or the one or more PDCCH blocks.

At 610, the UE 602 may select at least one first uplink precoder for at least one uplink channel corresponding to the at least one downlink channel based on the measuring of the at least one downlink channel. To select the at least one first uplink precoder, the at least one uplink channel corresponding to the at least one downlink channel may be estimated based on the measuring of the at least one downlink channel.

At 612, the UE 602 may transmit to the BS 604, and the BS 604 may receive from the UE 602, at least one uplink reference signal based on the at least one first uplink precoder for the at least one uplink channel. The at least one uplink reference signal may be indicative of at least one second uplink precoder for the at least one uplink channel. The at least one second uplink precoder may be a subset of the at least one first uplink precoder. The at least one second uplink precoder may be selected by the UE 602 from the at least one first uplink precoder based on one or more layer quality metrics or a configuration received from the BS. For example, the UE 602 may not select a first uplink precoder if the first uplink precoder is associated with layer quality metrics that indicate a corresponding layer quality that is below a threshold. The quality metrics used by the UE 602 for downselecting among the at least one first uplink precoder may include one or more of a received power of the reference signal on the corresponding layer, a signal quality (e.g., a signal to noise ratio) on the corresponding layer, properties (e.g., eigenvalues and singular values) of the channel matrix achieved by combining the corresponding layer with other layers, or a time period elapsed since the corresponding layer was last measured (e.g., older measurements may become outdated due to channel changes). The at least one uplink reference signal may include at least one SRS.

At 614, the BS 604 may select at least one third uplink precoder usable for uplink transmission, the at least one third uplink precoder being a subset of the at least one second uplink precoder. At 616, the BS 604 may transmit to the UE 602, and the UE 602 may receive from the BS 604, a scheduling grant indicative of the at least one third uplink precoder usable for uplink transmission. At 618, the UE 602 may transmit to the BS 604, and the BS 604 may receive from the UE 602, data based on the at least one third uplink precoder indicated in the scheduling grant.

In one aspect, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be less than the first quantity. The first quantity may be equal to the second quantity. A sum of the fourth quantity and the fifth quantity may be equal to the first quantity. In other words, the number of layers in the DMRS may be less than the specified number of layers for uplink measurement and transmission, and additional CSI-RS resources may be scheduled to enable additional measurements to make up the difference.

In one aspect, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be equal to or greater than the second quantity. The first quantity may be greater than the second quantity. A sum of the fourth quantity and the fifth quantity may be equal to the first quantity. The at least one second uplink precoder may be selected from the at least one first uplink precoder based on one or more layer quality metrics or a configuration received from the BS. In other words, the DMRS symbols may contain the same number of layers specified for uplink measurement and transmission or even more layers than specified, and additional CSI-RS resources may also be scheduled to further increase the number of layers information relating to which is available. The UE 602 may downselect from the available layer information.

In one aspect, the at least one first uplink precoder may correspond to a first quantity of layers. At least one second uplink precoder may correspond to a second quantity of layers. The at least one DMRS may correspond to a fourth quantity of layers. The fourth quantity may be equal to the first quantity and may be greater than the second quantity. In other words, the DMRS symbols may contain more layers than specified for uplink measurement and transmission, and the UE 602 may downselect from the available layer information.

In one aspect, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be less than the second quantity. The first quantity may be greater than the second quantity. A sum of the fourth quantity and the fifth quantity may be equal to the first quantity. In other words, the number of layers in DMRS symbols may be less than the specified number of layers for uplink measurement and transmission, and the network (e.g., the BS 604) may schedule additional CSI-RS resources to augment and replace some DMRS measurements, providing the UE 602 with additional flexibility to downselect from the available layer information. In one aspect, the at least one second uplink precoder selected by the UE 602 may be based entirely on the at least one CSI-RS and not on the at least one DMRS.

The at least one second uplink precoder may be selected by the UE 602 from the at least one first uplink precoder (i.e., the downselection) based on one or more layer quality metrics. For example, the UE 602 may not select a first uplink precoder if the first uplink precoder is associated with layer quality metrics that indicate a corresponding layer quality that is below a threshold. The quality metrics used by the UE 602 for downselecting among the at least one first uplink precoder may include one or more of a received power of the reference signal on the corresponding layer, a signal quality (e.g., a signal to noise ratio) on the corresponding layer, properties (e.g., eigenvalues and singular values) of the channel matrix achieved by combining the corresponding layer with other layers, or a time period elapsed since the corresponding layer was last measured (e.g., older measurements may become outdated due to channel changes). In another aspect, the at least one second uplink precoder is selected by the UE 602 from the at least one first uplink precoder (i.e., the downselection) based on a configuration received from the BS 604.

Figure 7:
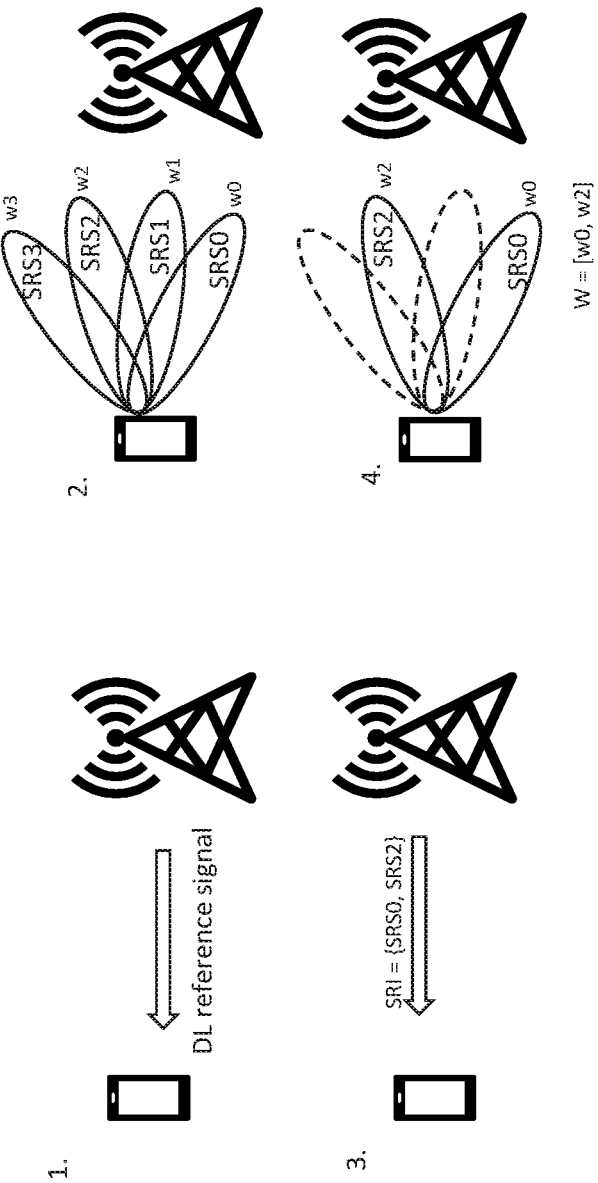
FIG. 7 is a diagram illustrating non-codebook-based uplink precoder selection procedure.

FIG. 7 is a diagram 700 illustrating non-codebook-based uplink precoder selection procedure. FIG. 7 differs from FIG. 5 in the first operation. In the first operation in FIG. 5, a CSI-RS may be transmitted from the BS to the UE. In contrast, in the first operation in FIG. 7, the DL reference signal transmitted from the BS to the UE is not limited to a CSI-RS. As explained herein, the DL reference signal may include at least one DMRS. In some aspects, the DL reference signal may further include at least one CSI-RS.

Figure 8:
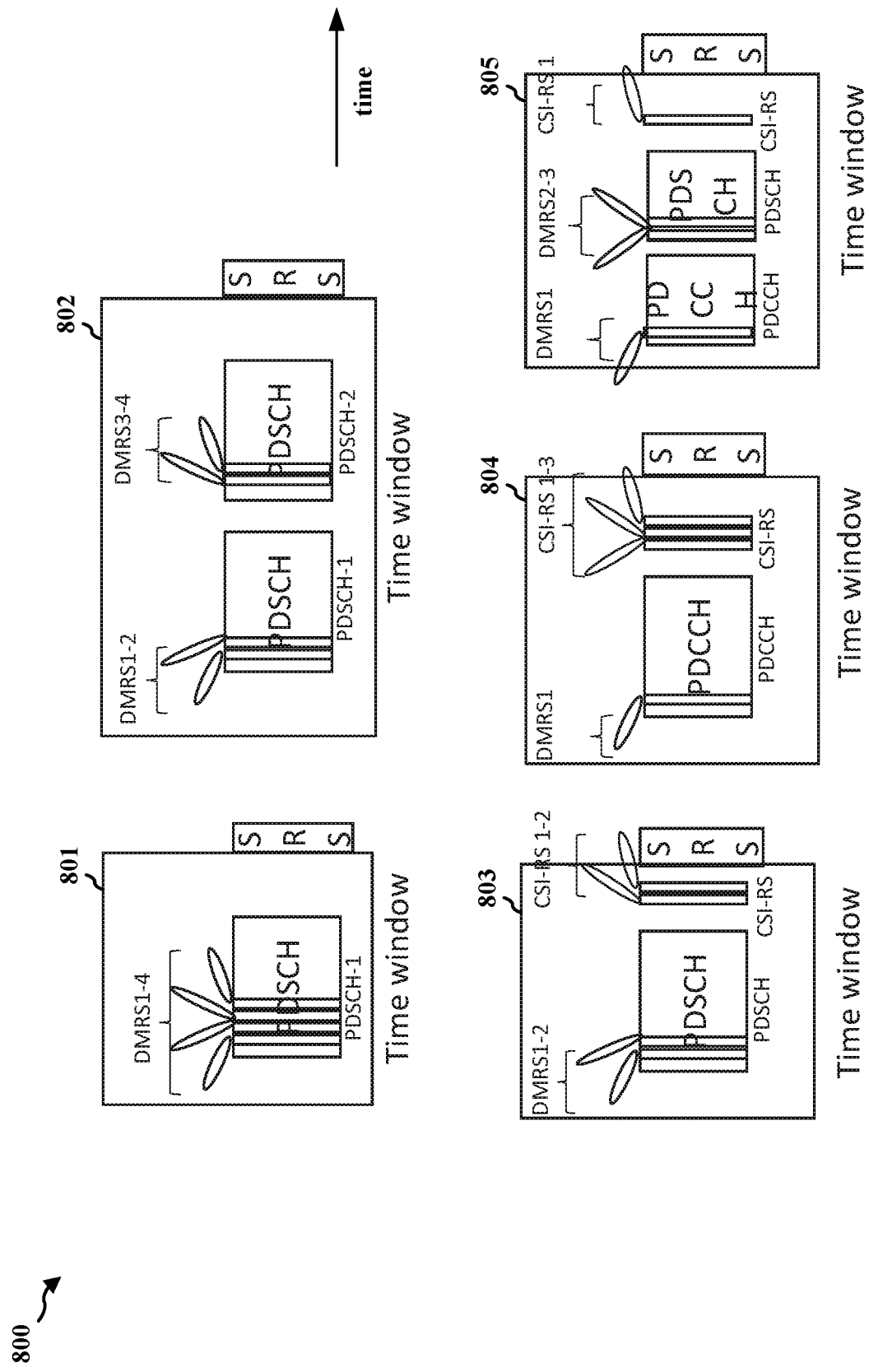
FIG. 8 is a diagram illustrating example downlink reference signals transmitted and received within a predetermined time window to enable an example four-layer channel measurement.

FIG. 8 is a diagram 800 illustrating example downlink reference signals transmitted and received within a predetermined time window to enable an example four-layer channel measurement. The predetermined time window may be in connection with a scheduled uplink grant and the at least one uplink reference signal (e.g., at least one SRS transmission, such as the SRSs transmitted in the second operation of FIG. 7). In particular, as shown in FIG. 8, the predetermined time window may immediately precede the transmission of the at least one uplink reference signal. In the example 801, DMRSs corresponding to four layers (orthogonal ports) may be transmitted and received in a first PDSCH block. In example 802, DMRSs corresponding to two layers may be transmitted and received in a first PDSCH block, and DMRSs corresponding to another two layers may be transmitted in a second PDSCH block, bringing the total number of layers to four. In the example 803, DMRSs corresponding to two layers may be transmitted and received in a PDSCH block, and CSI-RS corresponding to another two layers may be scheduled to bring the total number of layers to four. In the example 804, a DMRS corresponding to one layer may be transmitted and received in a PDCCH block, and a CSI-RS corresponding to another three layers may be scheduled to bring the total number of layers to four. In the example 805, a DMRS corresponding to one layer may be transmitted in a PDCCH block, additional DMRSs corresponding to another two layers may be transmitted and received in a PDSCH block, and a CSI-RS corresponding to one additional layer may be scheduled to bring the total number of layers to four. Therefore, the DMRS and the CSI-RS, as well as the DMRS in PDCCH blocks and the DMRS in PDSCH blocks, may be flexibly combined to enable multi-layer channel estimation.

Figure 9:
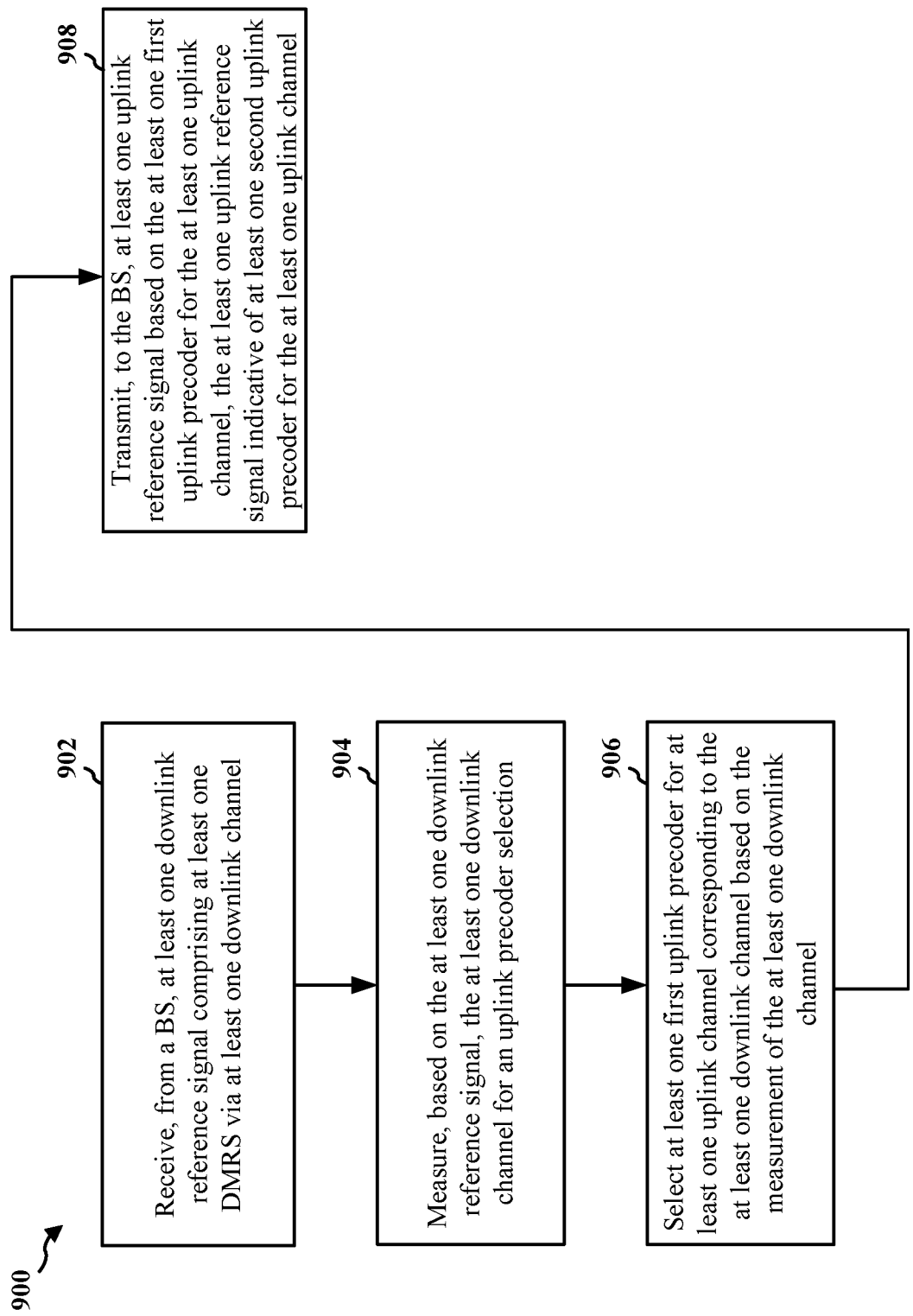
FIG. 9 is a flowchart of a method of wireless communication.

FIG. 9 is a flowchart 900 of a method of wireless communication. The method may be performed by a UE (e.g., the UE 104/350/602; the apparatus 1302). At 902, the UE may receive, from a BS, at least one downlink reference signal including at least one DMRS via at least one downlink channel. For example, 902 may be performed by reception component 1330. Referring to FIG. 6, at 606, the UE 602 may receive, from a BS 604, at least one downlink reference signal including at least one DMRS via at least one downlink channel.

At 904, the UE may measure, based on the at least one downlink reference signal, the at least one downlink channel. For example, 904 may be performed by precoder determination component 1340. The measuring may be based at least in part on the at least one DMRS. Referring to FIG. 6, at 608, the UE 602 may measure, based on the at least one downlink reference signal, the at least one downlink channel.

At 906, the UE may select at least one first uplink precoder for at least one uplink channel corresponding to the at least one downlink channel based on the measuring of the at least one downlink channel. For example, 906 may be performed by precoder determination component 1340. Referring to FIG. 6, at 610, the UE 602 may select at least one first uplink precoder for at least one uplink channel corresponding to the at least one downlink channel based on the measuring of the at least one downlink channel.

At 908, the UE may transmit, to the BS, at least one uplink reference signal based on the at least one first uplink precoder for the at least one uplink channel. For example, 908 may be performed by transmission component 1334. The at least one uplink reference signal may be indicative of at least one second uplink precoder for the at least one uplink channel. Referring to FIG. 6, at 612, the UE 602 may transmit, to the BS 604, at least one uplink reference signal based on the at least one first uplink precoder for the at least one one uplink channel.

Figure 10:
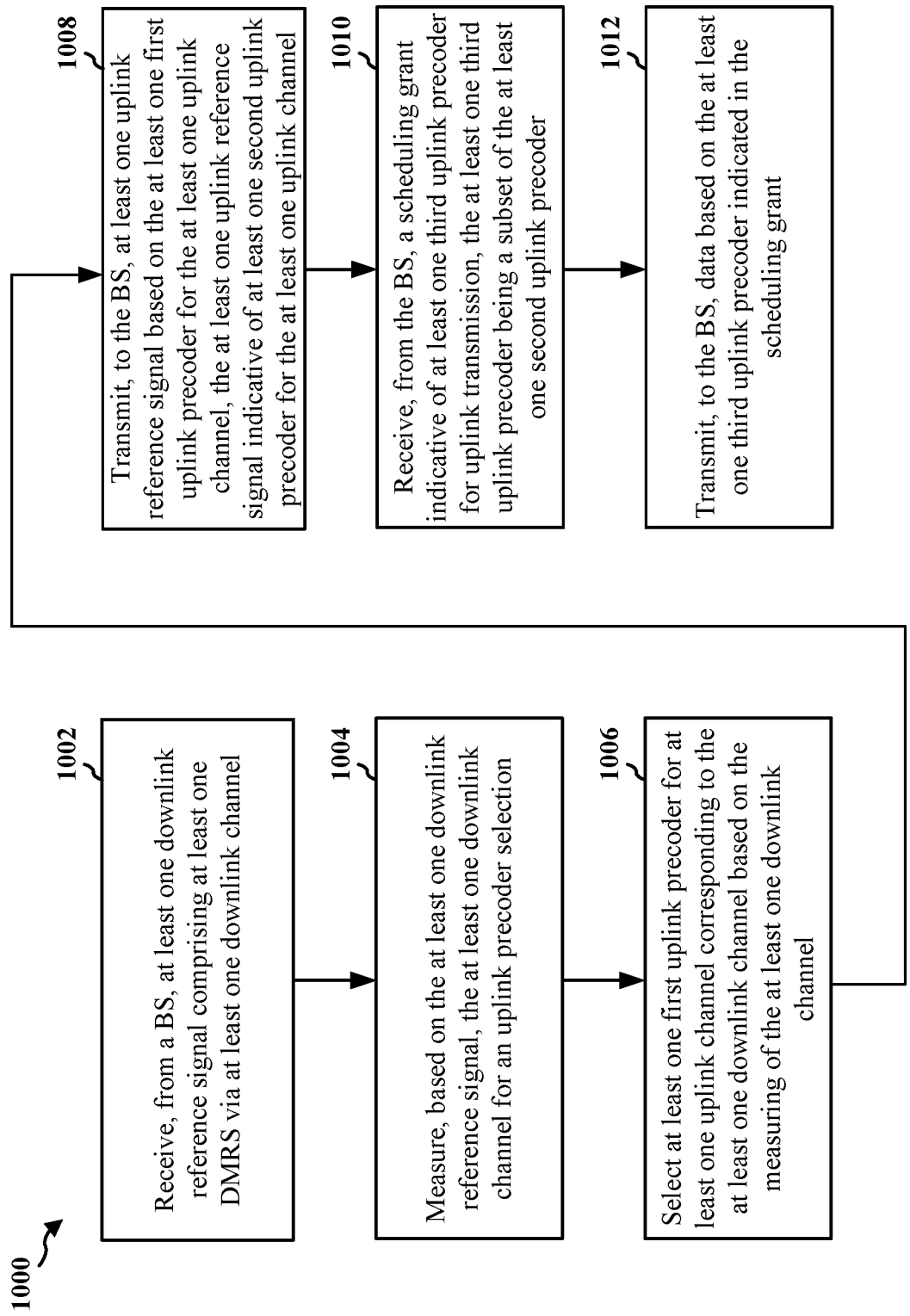
FIG. 10 is a flowchart of a method of wireless communication.

FIG. 10 is a flowchart 1000 of a method of wireless communication. The method may be performed by a UE (e.g., the UE 104/350/602; the apparatus 1302). At 1002, the UE may receive, from a BS, at least one downlink reference signal including at least one DMRS via at least one downlink channel. For example, 1002 may be performed by reception component 1330. Referring to FIG. 6, at 606, the UE 602 may receive, from a BS 604, at least one downlink reference signal including at least one DMRS via at least one downlink channel.

At 1004, the UE may measure, based on the at least one downlink reference signal, the at least one downlink channel. For example, 1004 may be performed by precoder determination component 1340. The measuring may be based at least in part on the at least one DMRS. Referring to FIG. 6, at 608, the UE 602 may measure, based on the at least one downlink reference signal, the at least one downlink channel.

At 1006, the UE may select at least one first uplink precoder for at least one uplink channel corresponding to the at least one downlink channel based on the measuring of the at least one downlink channel. For example, 1006 may be performed by precoder determination component 1340. Referring to FIG. 6, at 610, the UE 602 may select at least one first uplink precoder for at least one uplink channel corresponding to the at least one downlink channel based on the measuring of the at least one downlink channel.

At 1008, the UE may transmit, to the BS, at least one uplink reference signal based on the at least one first uplink precoder for the at least one uplink channel. For example, 1008 may be performed by transmission component 1334. The at least one uplink reference signal may be indicative of at least one second uplink precoder for the at least one uplink channel. Referring to FIG. 6, at 612, the UE 602 may transmit, to the BS 604, at least one uplink reference signal based on the at least one first uplink precoder for the at least one uplink channel.

In one configuration, the at least one uplink reference signal may be indicative of at least one second uplink precoder for the at least one uplink channel. The at least one second uplink precoder may be a subset of the at least one first uplink precoder.

In one configuration, at 1010, the UE may receive, from the BS, a scheduling grant indicative of at least one third uplink precoder for uplink transmission. For example, 1010 may be performed by reception component 1330. The at least one third uplink precoder may be a subset of the at least one second uplink precoder. Referring to FIG. 6, at 616, the UE 602 may receive, from the BS 604, a scheduling grant indicative of at least one third uplink precoder for uplink transmission. At 1012, the UE may transmit, to the BS, data based on the at least one third uplink precoder indicated in the scheduling grant. For example, 1012 may be performed by transmission component 1334. Referring to FIG. 6, at 618, the UE 602 may transmit, to the BS 604, data based on the at least one third uplink precoder indicated in the scheduling grant.

In one configuration, to select the at least one first uplink precoder, the UE may estimate the at least one uplink channel corresponding to the at least one downlink channel based on the measuring of the at least one downlink channel.

In one configuration, the at least one uplink reference signal may include at least one SRS.

In one configuration, the at least one DMRS may be received via at least one of a PDSCH or a PDCCH.

In one configuration, the measuring the at least one downlink channel may be based on the at least one DMRS being received within a predetermined time window in connection with a scheduled uplink grant and the at least one uplink reference signal.

In one configuration, the at least one DMRS may be received in at least one of one or more PDSCH blocks or one or more PDCCH blocks. An indication of a length of the predetermined time window may be received from the BS through at least one of a DCI, a MAC-CE, or RRC signaling prior to the reception of the at least one of the one or more PDSCH blocks or the one or more PDCCH blocks.

In one configuration, the at least one downlink reference signal may further include at least one CSI-RS. The measuring may be further based on the at least one CSI-RS.

In one configuration, the UE may further receive from the BS an indication of a QCL relationship between the at least one DMRS and the at least one CSI-RS for uplink precoder selection through a TCI state indication.

In one configuration, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be less than the first quantity. The first quantity may be equal to the second quantity. A sum of the fourth quantity and the fifth quantity may be equal to the first quantity.

In one configuration, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be equal to or greater than the second quantity. The first quantity may be greater than the second quantity. A sum of the fourth quantity and the fifth quantity may be equal to the first quantity. The at least one second uplink precoder may be selected from the at least one first uplink precoder based on one or more layer quality metrics or a configuration received from the BS.

In one configuration, the at least one first uplink precoder may correspond to a first quantity of layers. At least one second uplink precoder may correspond to a second quantity of layers. The at least one DMRS may correspond to a fourth quantity of layers. The fourth quantity may be equal to the first quantity and may be greater than the second quantity.

In one configuration, the at least one second uplink precoder may be selected from the at least one first uplink precoder based on one or more layer quality metrics or a configuration received from the BS.

Figure 11:
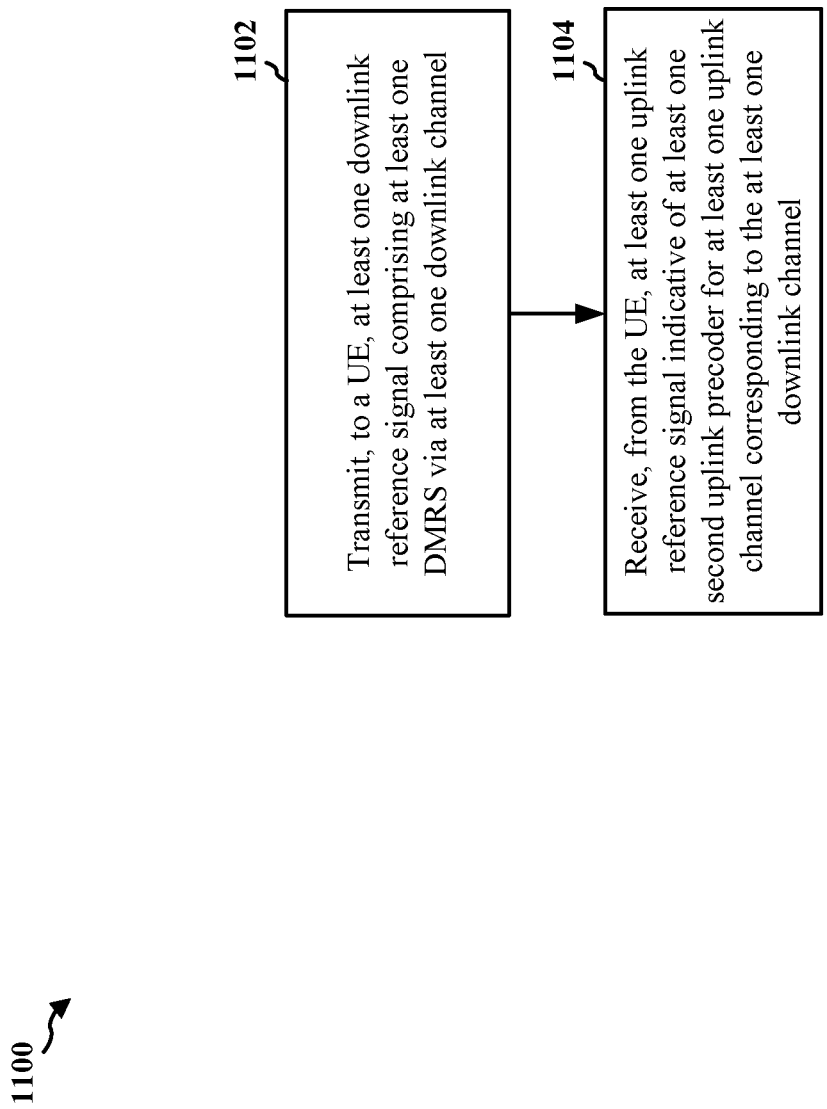
FIG. 11 is a flowchart of a method of wireless communication.

FIG. 11 is a flowchart 1100 of a method of wireless communication. The method may be performed by a base station (e.g., the base station 102/180/310/604; the apparatus 1402). At 1102, the BS may transmit, to a UE, at least one downlink reference signal including at least one DMRS via at least one downlink channel. For example, 1102 may be performed by transmission component 1434. The at least one downlink reference signal may be usable by the UE for measuring the at least one downlink channel. The measuring may be based at least in part on the at least one DMRS. Referring to FIG. 6, at 606, the BS 604 may transmit, to a UE 602, at least one downlink reference signal including at least one DMRS via at least one downlink channel.

At 1104, the BS may receive, from the UE, at least one uplink reference signal indicative of at least one second uplink precoder for at least one uplink channel corresponding to the at least one downlink channel. For example, 1104 may be performed by reception component 1430. The at least one second uplink precoder may be a subset of at least one first uplink precoder selected by the UE for the at least one uplink channel based on the measuring of the at least one downlink channel. Referring to FIG. 6, at 612, the BS 604 may receive, from the UE 602, at least one uplink reference signal indicative of at least one second uplink precoder for at least one uplink channel corresponding to the at least one downlink channel.

Figure 12:
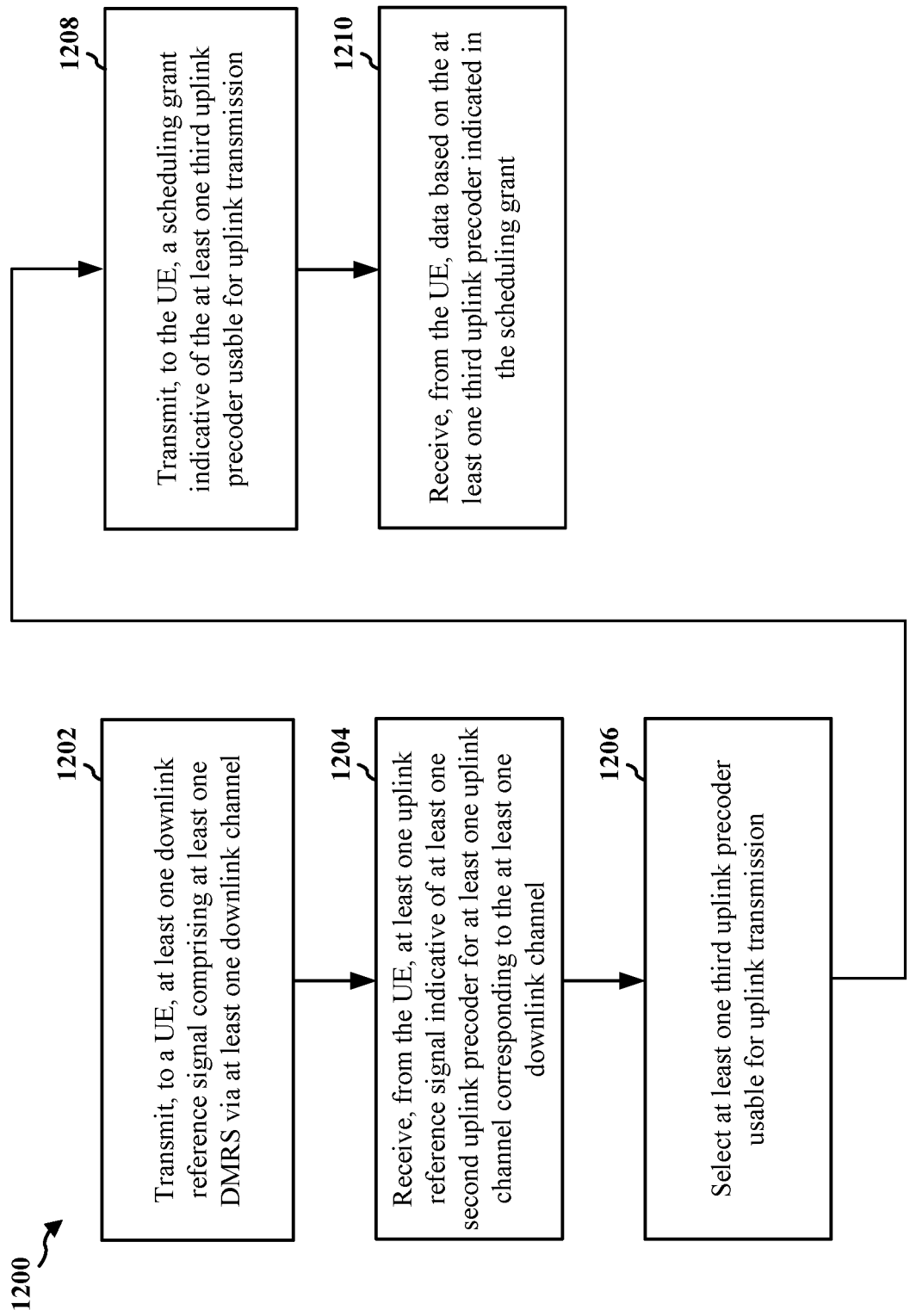
FIG. 12 is a flowchart of a method of wireless communication.

FIG. 12 is a flowchart 1200 of a method of wireless communication. The method may be performed by a base station (e.g., the base station 102/180/310/604; the apparatus 1402). At 1202, the BS may transmit, to a UE, at least one downlink reference signal including at least one DMRS via at least one downlink channel. For example, 1202 may be performed by transmission component 1434. The at least one downlink reference signal may be usable by the UE for measuring the at least one downlink channel. The measuring may be based at least in part on the at least one DMRS. Referring to FIG. 6, at 606, the BS 604 may transmit, to a UE 602, at least one downlink reference signal including at least one DMRS via at least one downlink channel.

At 1204, the BS may receive, from the UE, at least one uplink reference signal indicative of at least one second uplink precoder for at least one uplink channel corresponding to the at least one downlink channel. For example, 1204 may be performed by reception component 1430. The at least one second uplink precoder may be a subset of at least one first uplink precoder selected by the UE for the at least one uplink channel based on the measuring of the at least one downlink channel. Referring to FIG. 6, at 612, the BS 604 may receive, from the UE 602, at least one uplink reference signal indicative of at least one second uplink precoder for at least one uplink channel corresponding to the at least one downlink channel.

In one configuration, at 1206, the BS may select at least one third uplink precoder usable for uplink transmission. For example, 1206 may be performed by precoder determination component 1440. The at least one third uplink precoder may be a subset of the at least one second uplink precoder. Referring to FIG. 6, at 614, the BS 604 may select at least one third uplink precoder usable for uplink transmission.

In one configuration, at 1208, the BS may transmit, to the UE, a scheduling grant indicative of the at least one third uplink precoder usable for uplink transmission. For example, 1208 may be performed by transmission component 1434. Referring to FIG. 6, at 616, the BS 604 may transmit, to the UE 602, a scheduling grant indicative of the at least one third uplink precoder usable for uplink transmission. At 1210, the BS may receive, from the UE, data based on the at least one third uplink precoder indicated in the scheduling grant. For example, 1210 may be performed by reception component 1430. Referring to FIG. 6, at 618, the BS may receive, from the UE, data based on the at least one third uplink precoder indicated in the scheduling grant.

In one configuration, the at least one uplink reference signal may include at least one SRS.

In one configuration, the at least one DMRS may be transmitted via at least one of a PDSCH or a PDCCH.

In one configuration, the at least one downlink channel may be measured by the UE based on the at least one DMRS being transmitted within a predetermined time window in connection with a scheduled uplink grant and the at least one uplink reference signal.

In one configuration, the at least one DMRS may be transmitted in at least one of one or more PDSCH blocks or one or more PDCCH blocks. An indication of a length of the predetermined time window may be transmitted from the BS to the UE through at least one of a DCI, a MAC-CE, or RRC signaling prior to the transmission of the at least one of the one or more PDSCH blocks or the one or more PDCCH blocks.

In one configuration, the at least one downlink reference signal may further include at least one CSI-RS. The measuring may be further based on the at least one CSI-RS.

In one configuration, the BS may further transmit to the UE an indication of a QCL relationship between the at least one DMRS and the at least one CSI-RS for uplink precoder selection through a TCI state indication.

In one configuration, the at least one first uplink precoder may correspond to a first quantity of layers. The at least one second uplink precoder may correspond to a second quantity of layers. The at least one DMRS may correspond to a fourth quantity of layers. The at least one CSI-RS may correspond to a fifth quantity of layers. The fourth quantity may be less than the first quantity. The first quantity may be equal to the second quantity. A sum of the fourth quantity and the fifth quantity may be equal to the first quantity.

In one configuration, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be equal to or greater than the second quantity. The first quantity may be greater than the second quantity. A sum of the fourth quantity and the fifth quantity may be equal to the first quantity. The at least one second uplink precoder may be selected from the at least one first uplink precoder based on one or more layer quality metrics or a configuration received from the BS.

In one configuration, the at least one first uplink precoder may correspond to a first quantity of layers. The at least one second uplink precoder may correspond to a second quantity of layers. The at least one DMRS may correspond to a fourth quantity of layers. And the fourth quantity may be equal to the first quantity and may be greater than the second quantity.

In one configuration, the at least one second uplink precoder may be selected by the UE from the at least one first uplink precoder based on one or more layer quality metrics.

In one configuration, the at least one second uplink precoder may be selected by the UE from the at least one first uplink precoder based on a configuration transmitted from the BS to the UE.

Figure 13:
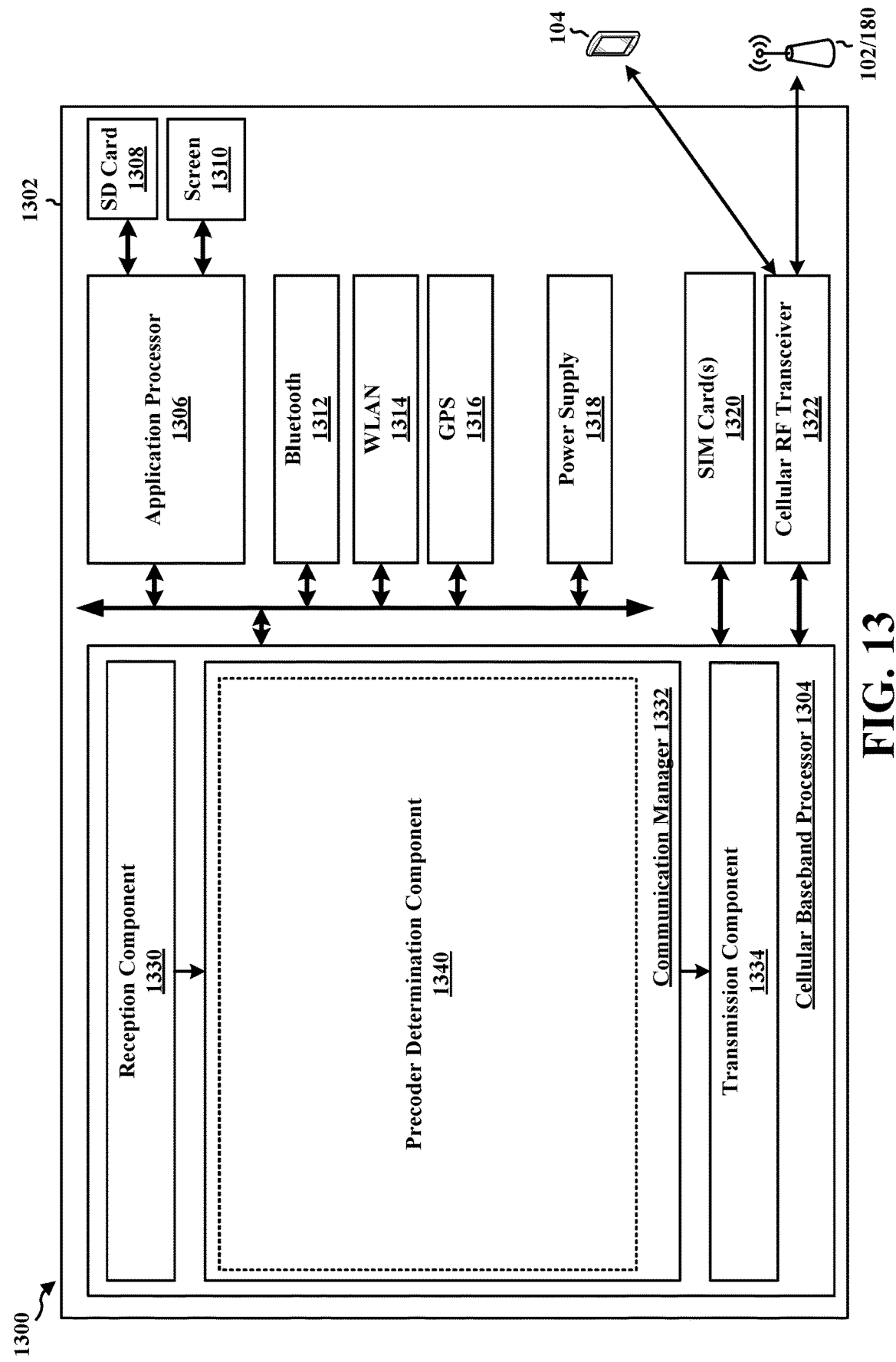
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a precoder determination component 1340 that is configured, together with reception component 1330, to receive, from a BS, at least one downlink reference signal including at least one DMRS via at least one downlink channel, e.g., as described in connection with 902 in FIGS. 9 and 1002 in FIG. 10. The precoder determination component 1340 is further configured to measure, based on the at least one downlink reference signal, the at least one downlink channel, e.g., as described in connection with 904 in FIGS. 9 and 1004 in FIG. 10. The measuring may be based at least in part on the at least one DMRS. The precoder determination component 1340 is further configured to select at least one first uplink precoder for at least one uplink channel corresponding to the at least one downlink channel based on the measuring of the at least one downlink channel, e.g., as described in connection with 906 in FIGS. 9 and 1006 in FIG. 10. The precoder determination component 1340 is further configured, together with transmission component 1334, to transmit, to the BS, at least one uplink reference signal based on the at least one first uplink precoder for the at least one uplink channel, e.g., as described in connection with 908 in FIGS. 9 and 1008 in FIG. 10. The precoder determination component 1340 is further configured, together with reception component 1330, to receive, from the BS, a scheduling grant indicative of at least one third uplink precoder for uplink transmission, e.g., as described in connection with 1010 in FIG. 10. The at least one third uplink precoder may be a subset of the at least one second uplink precoder. The precoder determination component 1340 is further configured, together with transmission component 1334, to transmit, to the BS, data based on the at least one third uplink precoder indicated in the scheduling grant, e.g., as described in connection with 1012 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a BS, at least one downlink reference signal including at least one DMRS via at least one downlink channel. The apparatus 1302, and in particular the cellular baseband processor 1304, includes means for measuring, based on the at least one downlink reference signal, the at least one downlink channel, the measuring being based at least in part on the at least one DMRS. The apparatus 1302, and in particular the cellular baseband processor 1304, includes means for selecting at least one first uplink precoder for at least one uplink channel corresponding to the at least one downlink channel based on the measuring of the at least one downlink channel. The apparatus 1302, and in particular the cellular baseband processor 1304, includes means for transmitting, to the BS, at least one uplink reference signal based on the at least one first uplink precoder for the at least one uplink channel.

In one configuration, the at least one uplink reference signal may be indicative of at least one second uplink precoder for the at least one uplink channel. The at least one second uplink precoder may be a subset of the at least one first uplink precoder. In one configuration, the apparatus 1302, and in particular the cellular baseband processor 1304, includes means for receiving, from the BS, a scheduling grant indicative of at least one third uplink precoder for uplink transmission. The apparatus 1302, and in particular the cellular baseband processor 1304, includes means for transmitting, to the BS, data based on the at least one third uplink precoder indicated in the scheduling grant. In one configuration, to select the at least one first uplink precoder, the UE may estimate the at least one uplink channel corresponding to the at least one downlink channel based on the measuring of the at least one downlink channel. In one configuration, the at least one uplink reference signal may include at least one SRS. In one configuration, the at least one DMRS may be received via at least one of a PDSCH or a PDCCH. In one configuration, the measuring the at least one downlink channel may be based on the at least one DMRS being received within a predetermined time window in connection with a scheduled uplink grant and the at least one uplink reference signal. In one configuration, the at least one DMRS may be received in at least one of one or more PDSCH blocks or one or more PDCCH blocks. An indication of a length of the predetermined time window may be received from the BS through at least one of a DCI, a MAC-CE, or RRC signaling prior to the reception of the at least one of the one or more PDSCH blocks or the one or more PDCCH blocks. In one configuration, the at least one downlink reference signal may further include at least one CSI-RS. The measuring may be further based on the at least one CSI-RS. In one configuration, the UE may further receive from the BS an indication of a QCL relationship between the at least one DMRS and the at least one CSI-RS for uplink precoder selection through a TCI state indication. In one configuration, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be less than the first quantity. The first quantity may be equal to the second quantity. A sum of the fourth quantity and the fifth quantity may be equal to the first quantity. In one configuration, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be equal to or greater than the second quantity. The first quantity may be greater than the second quantity. A sum of the fourth quantity and the fifth quantity may be equal to the first quantity. The at least one second uplink precoder may be selected from the at least one first uplink precoder based on one or more layer quality metrics or a configuration received from the BS. In one configuration, the at least one first uplink precoder may correspond to a first quantity of layers. At least one second uplink precoder may correspond to a second quantity of layers. The at least one DMRS may correspond to a fourth quantity of layers. The fourth quantity may be equal to the first quantity and may be greater than the second quantity. In one configuration, the at least one second uplink precoder may be selected from the at least one first uplink precoder based on one or more layer quality metrics or a configuration received from the BS.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
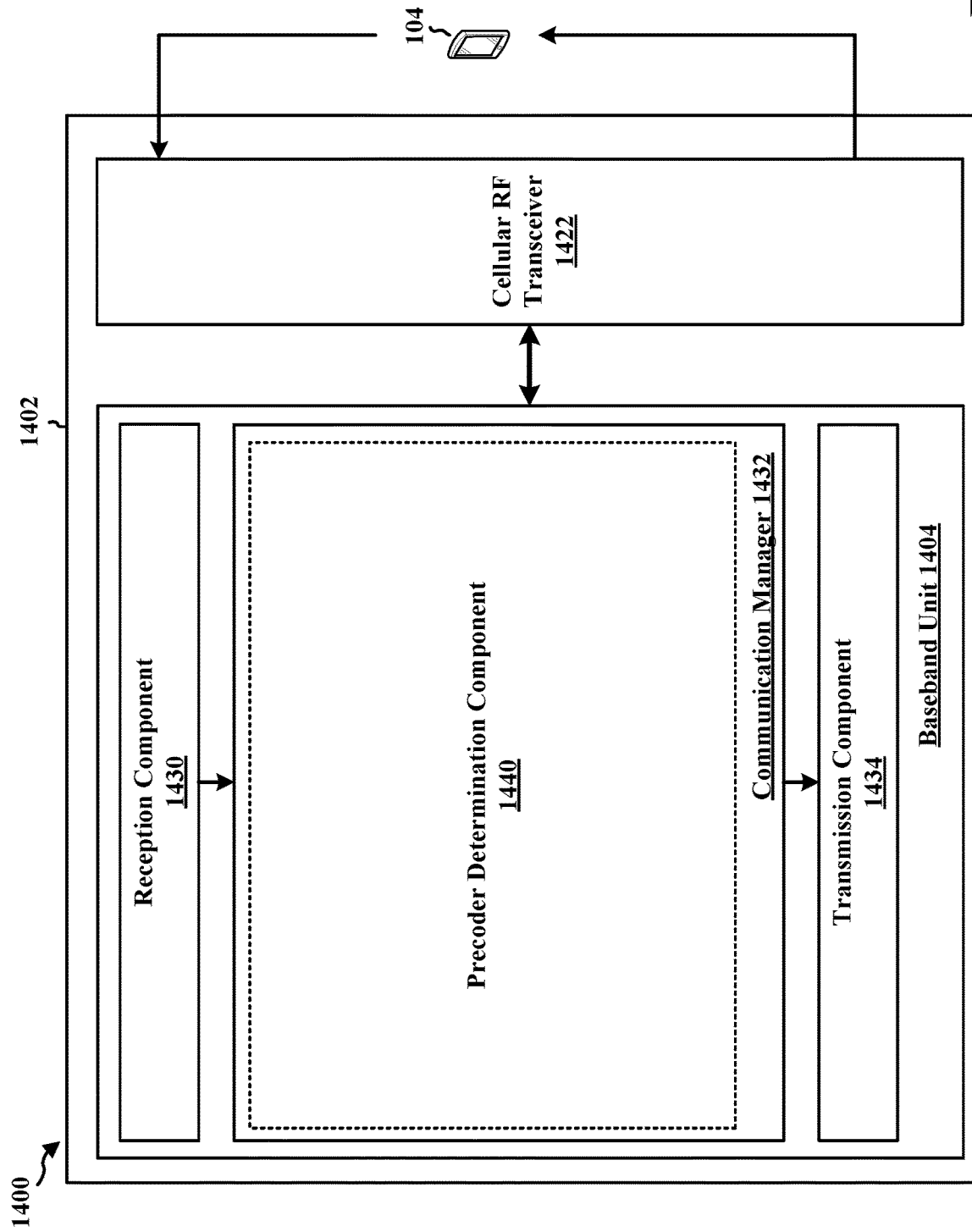
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a precoder determination component 1440 that is configured, together with transmission component 1434, to transmit, to a UE, at least one downlink reference signal including at least one DMRS via at least one downlink channel, e.g., as described in connection with 1102 in FIGS. 11 and 1202 in FIG. 12. The at least one downlink reference signal may be usable by the UE for measuring the at least one downlink channel. The measuring may be based at least in part on the at least one DMRS. The precoder determination component 1440 is further configured, together with reception component 1430, to receive, from the UE, at least one uplink reference signal indicative of at least one second uplink precoder for at least one uplink channel corresponding to the at least one downlink channel, e.g., as described in connection with 1104 in FIGS. 11 and 1204 in FIG. 12. The at least one second uplink precoder may be a subset of at least one first uplink precoder selected by the UE for the at least one uplink channel based on the measuring of the at least one downlink channel. The precoder determination component 1440 is further configured to select at least one third uplink precoder usable for uplink transmission, e.g., as described in connection with 1206 in FIG. 12. The at least one third uplink precoder may be a subset of the at least one second uplink precoder. The precoder determination component 1440 is further configured, together with transmission component 1434, to transmit, to the UE, a scheduling grant indicative of the at least one third uplink precoder usable for uplink transmission, e.g., as described in connection with 1208 in FIG. 12. The precoder determination component 1440 is further configured, together with reception component 1430, to receive, from the UE, data based on the at least one third uplink precoder indicated in the scheduling grant, e.g., as described in connection with 1210 in FIG. 12.

The apparatus may include additional components that perform each of the blocks of the algorithm in the flowcharts of FIGS. 6, 11, and 12. As such, each block in the flowcharts of FIGS. 6, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a UE, at least one downlink reference signal including at least one DMRS via at least one downlink channel, the at least one downlink reference signal being usable by the UE for measuring the at least one downlink channel, the measuring being based at least in part on the at least one DMRS. The apparatus 1402, and in particular the baseband unit 1404, includes means for receiving, from the UE, at least one uplink reference signal indicative of at least one second uplink precoder for at least one uplink channel corresponding to the at least one downlink channel, the at least one second uplink precoder being a subset of at least one first uplink precoder selected by the UE for the at least one uplink channel based on the measuring of the at least one downlink channel.

In one configuration, the apparatus 1402, and in particular the baseband unit 1404, includes means for selecting at least one third uplink precoder usable for uplink transmission. In one configuration, the apparatus 1402, and in particular the baseband unit 1404, includes means for transmitting, to the UE, a scheduling grant indicative of the at least one third uplink precoder usable for uplink transmission. The apparatus 1402, and in particular the baseband unit 1404, includes means for receiving, from the UE, data based on the at least one third uplink precoder indicated in the scheduling grant. In one configuration, the at least one uplink reference signal may include at least one SRS. In one configuration, the at least one DMRS may be transmitted via at least one of a PDSCH or a PDCCH. In one configuration, the at least one downlink channel may be measured by the UE based on the at least one DMRS being transmitted within a predetermined time window in connection with a scheduled uplink grant and the at least one uplink reference signal. In one configuration, the at least one DMRS may be transmitted in at least one of one or more PDSCH blocks or one or more PDCCH blocks. An indication of a length of the predetermined time window may be transmitted from the BS to the UE through at least one of a DCI, a MAC-CE, or RRC signaling prior to the transmission of the at least one of the one or more PDSCH blocks or the one or more PDCCH blocks. In one configuration, the at least one downlink reference signal may further include at least one CSI-RS. The measuring may be further based on the at least one CSI-RS. In one configuration, the BS may further transmit to the UE an indication of a QCL relationship between the at least one DMRS and the at least one CSI-RS for uplink precoder selection through a TCI state indication. In one configuration, the at least one first uplink precoder may correspond to a first quantity of layers. The at least one second uplink precoder may correspond to a second quantity of layers. The at least one DMRS may correspond to a fourth quantity of layers. The at least one CSI-RS may correspond to a fifth quantity of layers. The fourth quantity may be less than the first quantity. The first quantity may be equal to the second quantity. A sum of the fourth quantity and the fifth quantity may be equal to the first quantity. In one configuration, the at least one first uplink precoder may correspond to a first quantity of layers. At least one second uplink precoder may correspond to a second quantity of layers. The at least one DMRS may correspond to a fourth quantity of layers. The at least one CSI-RS may correspond to a fifth quantity of layers. The fourth quantity may be equal to or greater than the second quantity. The first quantity may be greater than the second quantity. A sum of the fourth quantity and the fifth quantity may be equal to the first quantity. The at least one second uplink precoder may be selected from the at least one first uplink precoder based on one or more layer quality metrics or a configuration received from the BS. In one configuration, the at least one first uplink precoder may correspond to a first quantity of layers. The at least one second uplink precoder may correspond to a second quantity of layers. The at least one DMRS may correspond to a fourth quantity of layers. And the fourth quantity may be equal to the first quantity and may be greater than the second quantity. In one configuration, the at least one second uplink precoder may be selected by the UE from the at least one first uplink precoder based on one or more layer quality metrics. In one configuration, the at least one second uplink precoder may be selected by the UE from the at least one first uplink precoder based on a configuration transmitted from the BS to the UE.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring again to FIGS. 6-14, a method and an apparatus for selecting an uplink precoder using a non-codebook-based procedure are disclosed. By leveraging the DMRS for channel estimation, reliance on extra CSI-RS resources may be reduced. Accordingly, signaling overhead may be reduced, and more slots may be made available for uplink data transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a BS, at least one downlink reference signal comprising at least one DMRS via at least one downlink channel; measure, based on the at least one downlink reference signal, the at least one downlink channel, the measuring being based at least in part on the at least one DMRS; select at least one first uplink precoder for at least one uplink channel corresponding to the at least one downlink channel based on the measuring of the at least one downlink channel; and transmit, to the BS, at least one uplink reference signal based on the at least one first uplink precoder for the at least one uplink channel.

Aspect 2 is the apparatus of aspect 1, where the at least one uplink reference signal is indicative of at least one second uplink precoder for the at least one uplink channel, the at least one second uplink precoder being a subset of the at least one first uplink precoder.

Aspect 3 is the apparatus of aspect 2, the at least one processor being further configured to: receive, from the BS, a scheduling grant indicative of at least one third uplink precoder for uplink transmission, the at least one third uplink precoder being a subset of the at least one second uplink precoder; and transmit, to the BS, data based on the at least one third uplink precoder indicated in the scheduling grant.

Aspect 4 is the apparatus of any of aspects 1 to 3, where the at least one processor configured to select the at least one first uplink precoder is further configured to estimate the at least one uplink channel corresponding to the at least one downlink channel based on the measuring of the at least one downlink channel.

Aspect 5 is the apparatus of any of aspects 1 to 4, where the at least one uplink reference signal comprises at least one SRS.

Aspect 6 is the apparatus of any of aspects 1 to 5, where the at least one DMRS is received via at least one of a PDSCH or a PDCCH.

Aspect 7 is the apparatus of aspect 6, where the measuring the at least one downlink channel is based on the at least one DMRS being received within a predetermined time window in connection with a scheduled uplink grant and the at least one uplink reference signal.

Aspect 8 is the apparatus of aspect 7, where the at least one DMRS is received in at least one of one or more PDSCH blocks or one or more PDCCH blocks, and an indication of a length of the predetermined time window is received from the BS through at least one of a DCI, a MAC-CE, or RRC signaling prior to the reception of the at least one of the one or more PDSCH blocks or the one or more PDCCH blocks.

Aspect 9 is the apparatus of any of aspects 1 to 8, where the at least one downlink reference signal further comprises at least one CSI-RS, and the measuring is further based on the at least one CSI-RS.

Aspect 10 is the apparatus of aspect 9, where the UE further receives from the BS an indication of a QCL relationship between the at least one DMRS and the at least one CSI-RS for uplink precoder selection through a TCI state indication.

Aspect 11 is the apparatus of aspect 9, where the at least one first uplink precoder corresponds to a first quantity of layers, at least one second uplink precoder corresponds to a second quantity of layers, the at least one DMRS corresponds to a fourth quantity of layers, the at least one CSI-RS corresponds to a fifth quantity of layers, the fourth quantity is less than the first quantity, the first quantity is equal to the second quantity, and a sum of the fourth quantity and the fifth quantity is equal to the first quantity.

Aspect 12 is the apparatus of aspect 9, where the at least one first uplink precoder corresponds to a first quantity of layers, at least one second uplink precoder corresponds to a second quantity of layers, the at least one DMRS corresponds to a fourth quantity of layers, the at least one CSI-RS corresponds to a fifth quantity of layers, the fourth quantity is equal to or greater than the second quantity, the first quantity is greater than the second quantity, a sum of the fourth quantity and the fifth quantity is equal to the first quantity, and the at least one second uplink precoder is selected from the at least one first uplink precoder based on one or more layer quality metrics or a configuration received from the BS.

Aspect 13 is the apparatus of any of aspects 1 to 8, where the at least one first uplink precoder corresponds to a first quantity of layers, at least one second uplink precoder corresponds to a second quantity of layers, the at least one DMRS corresponds to a fourth quantity of layers, and the fourth quantity is equal to the first quantity and is greater than the second quantity.

Aspect 14 is the apparatus of aspect 13, where the at least one second uplink precoder is selected from the at least one first uplink precoder based on one or more layer quality metrics.

Aspect 15 is the apparatus of aspect 13, where the at least one second uplink precoder is selected from the at least one first uplink precoder based on a configuration received from the BS.

Aspect 16 is the apparatus of aspect 1, further including a transceiver coupled to the at least one processor.

Aspect 17 is an apparatus for wireless communication at a BS including at least one processor coupled to a memory and configured to transmit, to a UE, at least one downlink reference signal comprising at least one DMRS via at least one downlink channel, the at least one downlink reference signal being usable by the UE for measuring the at least one downlink channel, the measuring being based at least in part on the at least one DMRS; and receive, from the UE, at least one uplink reference signal indicative of at least one second uplink precoder for at least one uplink channel corresponding to the at least one downlink channel, the at least one second uplink precoder being a subset of at least one first uplink precoder selected by the UE for the at least one uplink channel based on the measuring of the at least one downlink channel.

Aspect 18 is the apparatus of aspect 17, the at least one processor being further configured to: select at least one third uplink precoder usable for uplink transmission, the at least one third uplink precoder being a subset of the at least one second uplink precoder.

Aspect 19 is the apparatus of aspect 18, the at least one processor being further configured to: transmit, to the UE, a scheduling grant indicative of the at least one third uplink precoder usable for uplink transmission; and receive, from the UE, data based on the at least one third uplink precoder indicated in the scheduling grant.

Aspect 20 is the apparatus of any of aspects 17 to 19, where the at least one uplink reference signal comprises at least one SRS.

Aspect 21 is the apparatus of any of aspects 17 to 20, where the at least one DMRS is transmitted via at least one of a PDSCH or a PDCCH.

Aspect 22 is the apparatus of aspect 21, where the at least one downlink channel is measured by the UE based on the at least one DMRS being transmitted within a predetermined time window in connection with a scheduled uplink grant and the at least one uplink reference signal.

Aspect 23 is the apparatus of aspect 22, where the at least one DMRS is transmitted in at least one of one or more PDSCH blocks or one or more PDCCH blocks, and an indication of a length of the predetermined time window is transmitted from the BS to the UE through at least one of a DCI, a MAC-CE, or RRC signaling prior to the transmission of the at least one of the one or more PDSCH blocks or the one or more PDCCH blocks.

Aspect 24 is the apparatus of any of aspects 17 to 23, where the at least one downlink reference signal further comprises at least one CSI-RS, and the measuring is further based on the at least one CSI-RS.

Aspect 25 is the apparatus of aspect 24, where the BS further transmits to the UE an indication of a QCL relationship between the at least one DMRS and the at least one CSI-RS for uplink precoder selection through a TCI state indication.

Aspect 26 is the apparatus of aspect 24, where the at least one first uplink precoder corresponds to a first quantity of layers, the at least one second uplink precoder corresponds to a second quantity of layers, the at least one DMRS corresponds to a fourth quantity of layers, the at least one CSI-RS corresponds to a fifth quantity of layers, the fourth quantity is less than the first quantity, the first quantity is equal to the second quantity, and a sum of the fourth quantity and the fifth quantity is equal to the first quantity.

Aspect 27 is the apparatus of aspect 24, where the at least one first uplink precoder corresponds to a first quantity of layers, at least one second uplink precoder corresponds to a second quantity of layers, the at least one DMRS corresponds to a fourth quantity of layers, the at least one CSI-RS corresponds to a fifth quantity of layers, the fourth quantity is equal to or greater than the second quantity, the first quantity is greater than the second quantity, a sum of the fourth quantity and the fifth quantity is equal to the first quantity, and the at least one second uplink precoder is selected from the at least one first uplink precoder based on one or more layer quality metrics or a configuration received from the BS.

Aspect 28 is the apparatus of any of aspects 17 to 23, where the at least one first uplink precoder corresponds to a first quantity of layers, the at least one second uplink precoder corresponds to a second quantity of layers, the at least one DMRS corresponds to a fourth quantity of layers, and the fourth quantity is equal to the first quantity and is greater than the second quantity.

Aspect 29 is the apparatus of aspect 28, where the at least one second uplink precoder is selected by the UE from the at least one first uplink precoder based on one or more layer quality metrics.

Aspect 30 is the apparatus of aspect 28, where the at least one second uplink precoder is selected by the UE from the at least one first uplink precoder based on a configuration transmitted from the BS to the UE.

Aspect 31 is the apparatus of aspect 17, further including a transceiver coupled to the at least one processor.

Aspect 32 is a method of wireless communication for implementing any of aspects 1 to 31.

Aspect 33 is an apparatus for wireless communication including means for implementing a method as in any of aspects 1 to 31.

Aspect 34 is a computer-readable medium storing computer executable code, where the code when executed by a processor causes the processor to implement a method as in any of aspects 1 to 31.

What is claimed is:

1. An apparatus for wireless communication at a user equipment (UE), comprising:
    memory; and
    at least one processor coupled to the memory and configured to:
        receive, from a base station (BS), downlink control information (DCI), a media access control (MAC) control element (CE) (MAC-CE), or radio resource control (RRC) signaling that indicates a length of a time window;
        receive, from the BS, an uplink grant configured to schedule at least one uplink reference signal;
        receive, from the BS, at least one downlink reference signal comprising at least one demodulation reference signal (DMRS) and at least one channel state information reference signal (CSI-RS) via at least one downlink channel, the at least one downlink channel comprising at least one of a physical downlink shared channel (PDSCH) or a physical downlink control channel (PDCCH);
        measure, based on the at least one downlink reference signal and based on the at least one downlink channel being within the length of the time window from the uplink grant, the at least one downlink channel, the measuring being based jointly at least in part on the at least one DMRS and the at least one CSI-RS;
        select at least one first uplink precoder for at least one uplink channel corresponding to the at least one downlink channel based on the measuring of the at least one downlink channel, the at least one first uplink precoder being non-codebook based;
        transmit, to the BS, the at least one uplink reference signal based on the at least one first uplink precoder for the at least one uplink channel;
        receive, from the BS, an indication of a schedule for a set of additional downlink reference signals after transmission of the at least one uplink reference signal, wherein a quantity of the at least one uplink reference signal is less than a specified quantity; and
        transmit, to the BS based on a measurement of the set of additional downlink reference signals, a set of additional uplink reference signals associated with a set of additional uplink precoders.

2. The apparatus of claim 1, wherein the at least one uplink reference signal is indicative of at least one second uplink precoder for the at least one uplink channel, the at least one second uplink precoder being a subset of the at least one first uplink precoder.

3. The apparatus of claim 2, the at least one processor being further configured to:
    receive, from the BS, a scheduling grant indicative of at least one third uplink precoder for uplink transmission, the at least one third uplink precoder being a subset of the at least one second uplink precoder; and
    transmit, to the BS, data based on the at least one third uplink precoder indicated in the scheduling grant.

4. The apparatus of claim 1, wherein to select the at least one first uplink precoder, the at least one processor is configured to estimate the at least one uplink channel corresponding to the at least one downlink channel based on the measuring of the at least one downlink channel.

5. The apparatus of claim 1, wherein the at least one uplink reference signal comprises at least one sounding reference signal (SRS).

6. The apparatus of claim 1, wherein the at least one processor is further configured to receive from the BS an indication of a quasi co-location (QCL) relationship between the at least one DMRS and the at least one CSI-RS for uplink precoder selection through a transmission configuration indicator (TCI) state indication.

7. The apparatus of claim 1, wherein the at least one first uplink precoder corresponds to a first quantity of layers, at least one second uplink precoder corresponds to a second quantity of layers, the at least one DMRS corresponds to a fourth quantity of layers, the at least one CSI-RS corresponds to a fifth quantity of layers, the fourth quantity is less than the first quantity, the first quantity is equal to the second quantity, and a sum of the fourth quantity and the fifth quantity is equal to the first quantity.

8. The apparatus of claim 1, wherein the at least one first uplink precoder corresponds to a first quantity of layers, at least one second uplink precoder corresponds to a second quantity of layers, the at least one DMRS corresponds to a fourth quantity of layers, the at least one CSI-RS corresponds to a fifth quantity of layers, the fourth quantity is equal to or greater than the second quantity, the first quantity is greater than the second quantity, a sum of the fourth quantity and the fifth quantity is equal to the first quantity, and the at least one second uplink precoder is selected from the at least one first uplink precoder based on one or more layer quality metrics or a configuration received from the BS.

9. The apparatus of claim 1, wherein the at least one first uplink precoder corresponds to a first quantity of layers, at least one second uplink precoder corresponds to a second quantity of layers, the at least one DMRS corresponds to a fourth quantity of layers, and the fourth quantity is equal to the first quantity and is greater than the second quantity.

10. The apparatus of claim 9, further comprising a transceiver coupled to the at least one processor, wherein the at least one second uplink precoder is selected from the at least one first uplink precoder based on one or more layer quality metrics or a configuration received from the BS.

11. A method of wireless communication of a user equipment (UE), comprising:
receiving, from a base station (BS), downlink control information (DCI), a media access control (MAC) control element (CE) (MAC-CE), or radio resource control (RRC) signaling that indicates a length of a time window;
receiving, from the BS, an uplink grant configured to schedule at least one uplink reference signal;
receiving, from the BS, at least one downlink reference signal comprising at least one demodulation reference signal (DMRS) and at least one channel state information reference signal (CSI-RS) via at least one downlink channel, the at least one downlink channel comprising at least one of a physical downlink shared channel (PDSCH) or a physical downlink control channel (PDCCH);
measuring, based on the at least one downlink reference signal and based on the at least one downlink channel being within the length of the time window from the uplink grant, the at least one downlink channel, the measuring being based jointly at least in part on the at least one DMRS and the at least one CSI-RS;
selecting at least one first uplink precoder for at least one uplink channel corresponding to the at least one downlink channel based on the measuring of the at least one downlink channel, the at least one first uplink precoder being non-codebook based;
transmitting, to the BS, the at least one uplink reference signal based on the at least one first uplink precoder for the at least one uplink channel;
receiving, from the BS, an indication of a schedule for a set of additional downlink reference signals after transmission of the at least one uplink reference signal, wherein a quantity of the at least one uplink reference signal is less than a specified quantity; and
transmitting, to the BS based on a measurement of the set of additional downlink reference signals, a set of additional uplink reference signals associated with a set of additional uplink precoders.

12. An apparatus for wireless communication at a base station (BS), comprising:
memory; and
at least one processor coupled to the memory and configured to:
transmit, to a user equipment (UE), downlink control information (DCI), a media access control (MAC) control element (CE) (MAC-CE), or radio resource control (RRC) signaling that indicates a length of a time window;
transmit, to the UE, an uplink grant configured to schedule at least one uplink reference signal;
transmit, to the UE, at least one downlink reference signal comprising at least one demodulation reference signal (DMRS) and at least one channel state information reference signal (CSI-RS) via at least one downlink channel, the at least one downlink channel being within the length of the time window from the uplink grant;
receive, from the UE, the at least one uplink reference signal indicative of at least one second uplink precoder for at least one uplink channel corresponding to the at least one downlink channel, the at least one second uplink precoder being a subset of at least one first uplink precoder for the at least one uplink channel, the at least one first uplink precoder being non-codebook based;
transmit, to the UE based on a quantity of the at least one uplink reference signal being less than a specified quantity, an indication of a schedule for a set of additional downlink reference signals after transmission of the at least one uplink reference signal; and
receive, from the UE based on the set of additional downlink reference signals, a set of additional uplink reference signals associated with a set of additional uplink precoders.

13. The apparatus of claim 12, the at least one processor being further configured to:
select at least one third uplink precoder usable for uplink transmission, the at least one third uplink precoder being a subset of the at least one second uplink precoder.

14. The apparatus of claim 13, the at least one processor being further configured to:
transmit, to the UE, a scheduling grant indicative of the at least one third uplink precoder usable for uplink transmission; and
receive, from the UE, data based on the at least one third uplink precoder indicated in the scheduling grant.

15. The apparatus of claim 14, wherein the at least one uplink reference signal comprises at least one sounding reference signal (SRS).

16. The apparatus of claim 12, wherein the at least one processor is further configured to transmit to the UE an indication of a quasi co-location (QCL) relationship between the at least one DMRS and the at least one CSI-RS for uplink precoder selection through a transmission configuration indicator (TCI) state indication.

17. The apparatus of claim 12, wherein the at least one first uplink precoder corresponds to a first quantity of layers, the at least one second uplink precoder corresponds to a second quantity of layers, the at least one DMRS corresponds to a fourth quantity of layers, the at least one CSI-RS corresponds to a fifth quantity of layers, the fourth quantity is less than the first quantity, the first quantity is equal to the second quantity, and a sum of the fourth quantity and the fifth quantity is equal to the first quantity.

18. The apparatus of claim 12, wherein the at least one first uplink precoder corresponds to a first quantity of layers, at least one second uplink precoder corresponds to a second quantity of layers, the at least one DMRS corresponds to a fourth quantity of layers, the at least one CSI-RS corresponds to a fifth quantity of layers, the fourth quantity is equal to or greater than the second quantity, the first quantity is greater than the second quantity, a sum of the fourth quantity and the fifth quantity is equal to the first quantity, and the at least one second uplink precoder is selected from the at least one first uplink precoder based on one or more layer quality metrics or a configuration received from the BS.

19. The apparatus of claim 12, wherein the at least one first uplink precoder corresponds to a first quantity of layers, the at least one second uplink precoder corresponds to a second quantity of layers, the at least one DMRS corresponds to a fourth quantity of layers, and the fourth quantity is equal to the first quantity and is greater than the second quantity.

20. A method of wireless communication of a base station (BS), comprising:
- transmitting, to a user equipment (UE), downlink control information (DCI), a media access control (MAC) control element (CE) (MAC-CE), or radio resource control (RRC) signaling that indicates a length of a time window;
- transmitting, to the UE, an uplink grant configured to schedule at least one uplink reference signal;
- transmitting, to the UE, at least one downlink reference signal comprising at least one demodulation reference signal (DMRS) and at least one channel state information reference signal (CSI-RS) via at least one downlink channel, the at least one downlink channel being within the length of the time window from the uplink grant;
- receiving, from the UE, the at least one uplink reference signal indicative of at least one second uplink precoder for at least one uplink channel corresponding to the at least one downlink channel, the at least one second uplink precoder being a subset of at least one first uplink precoder for the at least one uplink channel, the at least one first uplink precoder being non-codebook based;
- transmitting, to the UE based on a quantity of the at least one uplink reference signal being less than a specified quantity, an indication of a schedule for a set of additional downlink reference signals after transmission of the at least one uplink reference signal; and
- receiving, from the UE based on the set of additional downlink reference signals, a set of additional uplink reference signals associated with a set of additional uplink precoders.

* * * * *